(12) United States Patent
Naganuma et al.

(10) Patent No.: US 8,158,293 B2
(45) Date of Patent: Apr. 17, 2012

(54) FUEL CELL SYSTEM

(75) Inventors: Yoshiaki Naganuma, Toyota (JP); Hiromi Tanaka, Toyota (JP); Osamu Yumita, Seto (JP); Masashi Fuji, Toyota (JP); Nobukazu Mizuno, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/103,723

(22) Filed: May 9, 2011

(65) Prior Publication Data
US 2011/0293972 A1 Dec. 1, 2011

Related U.S. Application Data

(63) Continuation of application No. PCT/JP2010/003575, filed on May 27, 2010.

(51) Int. Cl.
*H01M 8/04* (2006.01)
(52) U.S. Cl. ........ 429/430; 429/431; 429/432; 429/443; 429/513
(58) Field of Classification Search .................. 429/430, 429/431, 432, 443, 513
See application file for complete search history.

(56) References Cited

FOREIGN PATENT DOCUMENTS

| JP | 2006-156280 A | 6/2006 |
|---|---|---|
| JP | 2007-141744 A | 6/2007 |
| JP | 2008-269813 A | 11/2008 |
| JP | 2009-32605 A | 2/2009 |
| JP | 2009-054465 A | 3/2009 |
| JP | 2009-277502 A | 11/2009 |
| WO | 2009/028637 A1 | 3/2009 |
| WO | 2009/066585 A1 | 5/2009 |
| WO | 2009/084447 A1 | 7/2009 |

OTHER PUBLICATIONS

International Search Report issued Jul. 20, 2010 in PCT/JP2010/003575.

*Primary Examiner* — Helen O Conley
(74) *Attorney, Agent, or Firm* — Kenyon & Kenyon LLP

(57) ABSTRACT

A fuel cell system includes a fuel cell, a secondary battery, an oxidizing gas supplier, a gas supply flow regulator, an oxidizing gas supply path, a cathode off-gas exhaust path, a bypass flow path, a flow regulator, an available power output acquirer, and an operation controller, wherein the gas supply flow regulator regulates the gas supply flow rate to cause the oxidizing gas supplier to supply an excess gas flow rate, which is set to be greater than a target fuel gas-requiring gas flow rate, wherein the target fuel gas-requiring gas flow rate is the fuel cell-requiring gas flow rate to be supplied to the fuel cell in order to achieve the target current value, when the available power output is less than a minimum amount of electric power required for the oxidizing gas supplier to increase the gas supply flow rate from 0 to a preset gas flow rate within a preset time period, and the operation controller controls the flow regulator to make the bypass flow rate equal to a difference gas flow rate between the excess gas flow rate and the target fuel cell-requiring gas flow rate.

9 Claims, 12 Drawing Sheets

Fig.11
THIRD EMBODIMENT
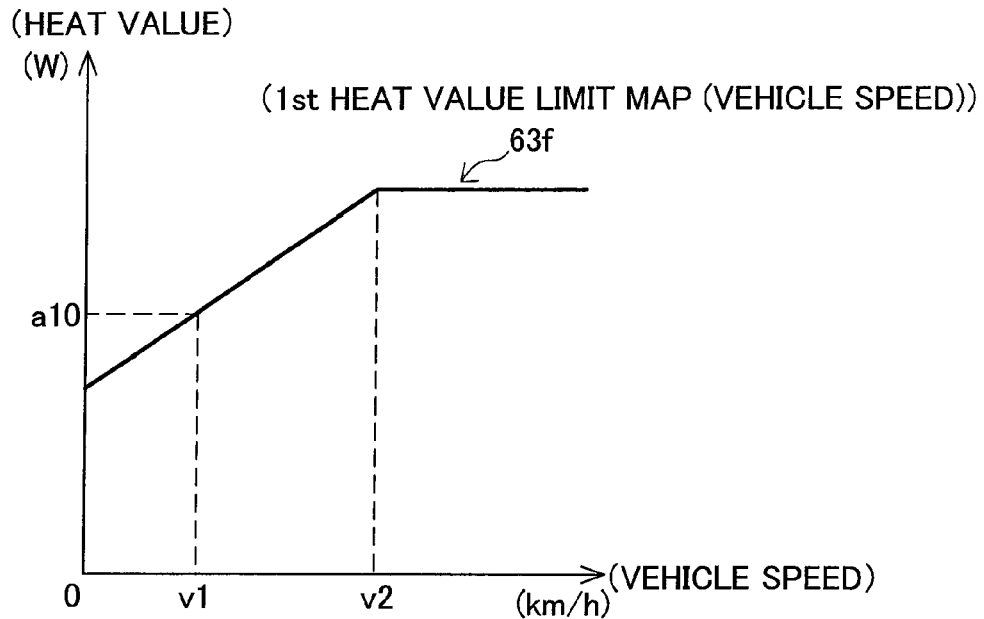
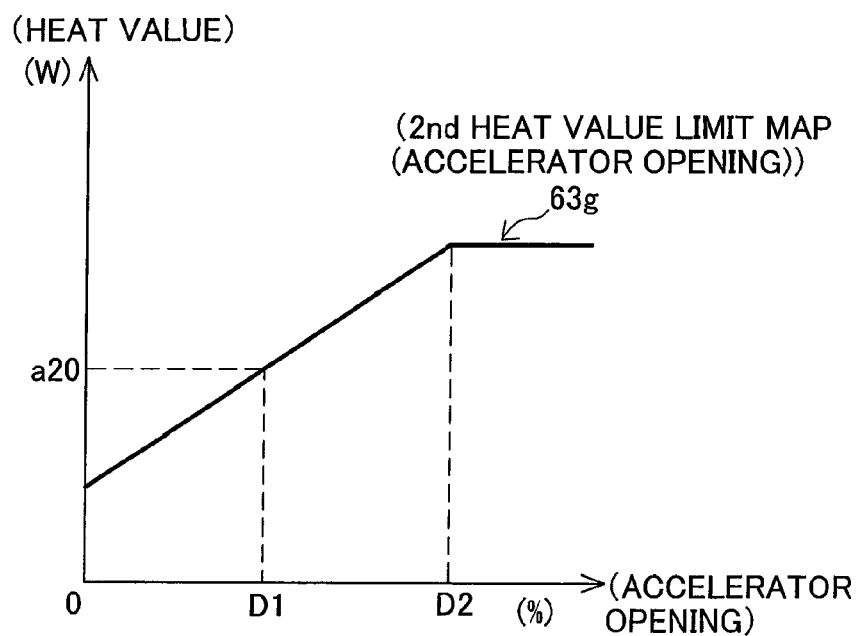

FUEL CELL SYSTEM

This is a By-pass continuation application of PCT/JP2010/003575 filed 27 May 2010, the content of which is incorporated herein by reference.

BACKGROUND OF THE INVENTION

1. Field of the Invention

The present invention relates to the use of waste heat of a fuel cell.

2. Description of the Related Art

One proposed technique adopted to start the operation of a fuel cell in the low-temperature environment triggers specific operation where the fuel cell is operated to generate electric power at a lower efficiency than the normal operation (hereafter this specific operation is referred to as "low-efficiency operation") to increase a heat loss (waste heat) of the fuel cell and warm up the fuel cell with the waste heat. Another proposed technique triggers the low-efficiency operation in the state where electric power is supplied from the fuel cell to a load connected with the fuel cell. The proposed technique may be applied to, for example, an electric vehicle equipped with a fuel cell to initiate the low-efficiency operation immediately after a start of the electric vehicle, enable the electric vehicle to start driving at the timing when the temperature of the fuel cell reaches or exceeds a preset temperature, and continue warming up the fuel cell to a warm-up termination temperature while driving the electric vehicle.

There is still room for improvement of the output response and the heat generation response during the low-efficiency operation performed with supply of electric power to the load.

SUMMARY

By taking into account at least part of the issue discussed above, there is a need for improving the output response and the heat generation response of a fuel cell during the low-efficiency operation performed with supply of electric power from the fuel cell to a load.

In order to address at least part of the requirement described above, the present invention provides various embodiments and applications described below.

[Aspect 1] According to an aspect of the present invention, a fuel cell system is provided. The fuel cell system comprises: a fuel cell; a secondary battery connected with the fuel cell; an oxidizing gas supplier configured to supply an oxidizing gas to the fuel cell to be utilized for power generation by the fuel cell and operated by electric power supplied from the secondary battery; a gas supply flow regulator configured to regulate a gas supply flow rate, wherein the gas supply flow rate is amount of the oxidizing gas supplied by the oxidizing gas supplier; an oxidizing gas supply path arranged to connect the oxidizing gas supplier with the fuel cell; a cathode off-gas exhaust path arranged to discharge cathode off-gas from the fuel cell; a bypass flow path arranged to connect the oxidizing gas supply path with the cathode off-gas exhaust path; a flow regulator configured to control a flow ratio of a fuel cell-requiring gas flow rate to a bypass flow rate in a total flow of the oxidizing gas supplied from the oxidizing gas supplier, wherein the a flow ratio of a fuel cell-requiring gas flow rate is a flow rate of the oxidizing gas flowing through the oxidizing gas supply path to the fuel cell, wherein the bypass flow rate is a flow rate of the oxidizing gas flowing through the oxidizing gas supply path to the bypass flow path; an available power output acquirer configured to obtain an available amount of power output from the secondary battery; and an operation controller configured to set a target current value and a target voltage value of the fuel cell based on a required amount of power output and a required amount of heat for the fuel cell, and control the flow regulator to regulate the fuel cell-requiring gas flow rate and the bypass flow rate, so as to achieve low-efficiency operation of the fuel cell, where the fuel cell is operated at an operating point of a lower power generation efficiency than a power generation efficiency on a current-voltage characteristic curve of the fuel cell, wherein the gas supply flow regulator regulates the gas supply flow rate to cause the oxidizing gas supplier to supply an excess gas flow rate, which is set to be greater than a target fuel gas-requiring gas flow rate, wherein the target fuel gas-requiring gas flow rate is the fuel cell-requiring gas flow rate to be supplied to the fuel cell in order to achieve the target current value, when the available amount of power output from the secondary battery is less than a minimum amount of electric power required for the oxidizing gas supplier to increase the gas supply flow rate from 0 to a preset gas flow rate within a preset time period, and the operation controller controls the flow regulator to make the bypass flow rate equal to a difference gas flow rate between the excess gas flow rate and the target fuel cell-requiring gas flow rate.

When the available amount of power output or available amount of power output from the secondary battery is less than the minimum amount of electric power required for the oxidizing gas supplier to increase the gas supply flow rate from 0 to the preset gas flow rate within the preset time period, the fuel cell system according to the Aspect1 of the invention regulates the gas supply flow rate to cause the oxidizing gas supplier to supply the excess gas flow rate. Even when an increase of the load connected with the fuel cell requires increasing the fuel cell-requiring gas flow rate in the state that the secondary battery has a relatively low level of the available amount of power output, the preliminary supply of the excess gas flow rate by the oxidizing gas supplier decreases the bypass flow rate and thereby effectively prevents the supply response of the oxidizing gas from being lowered. Even in the event of an increase of the load during the low-efficiency operation performed with supply of electric power from the fuel cell to the load, the fuel cell system of the Aspect1 thus effectively improves the output response and the heat generation response of the fuel cell stack.

[Aspect2] In the fuel cell system described in the Aspect 1, the gas supply flow regulator regulates the gas supply flow rate such as to increase the excess gas flow rate with a decrease of the available amount of power output from the secondary battery.

Even in the state where the smaller available amount of power output of the secondary battery lowers the gas supply flow rate that can be supplied by the oxidizing gas supplier with the electric power supplied from the secondary battery, the fuel cell system of the Aspect2 increases the excess gas flow rate supplied by the oxidizing gas supplier. When the fuel cell-requiring gas flow rate increases with an increase of the load connected with the fuel cell, this arrangement effectively prevents the supply response of the oxidizing gas from being lowered.

[Aspect 3] In the fuel cell system described in either one of Aspect 1 and 2, the excess gas flow rate is the gas supply flow rate determined in advance according to the available amount of power output from the secondary battery as a required amount to increase the gas supply flow rate to the preset gas flow rate within the preset time period.

Even when the secondary battery has small available amount of power output, the fuel cell system of the Aspect 3 enables the gas supply flow rate to be increased to the preset gas flow rate within the preset time period. Even in the state where the secondary battery has a relatively low level of the available amount of power output, this arrangement enables the oxidizing gas supplier to maintain a preset supply response as the supply response of the oxidizing gas.

[Aspect 4] In the fuel cell system described in any one of Aspects 1 through 3, the operation controller corrects the target current value set according to the required amount of power output and the required amount of heat for the fuel cell, based on a current value arising from a capacitor component of the fuel cell.

The fuel cell system of the Aspect 4 sets the target current value to cancel out the varying energy amount arising from the capacitor component of the fuel cell with a variation in target voltage value of the fuel cell. This arrangement assures the accurate control to cause the fuel cell to be operated at a target operating point, thus improving the output response and the heat generation response of the fuel cell stack.

[Aspect 5] In the fuel cell system described in any one of Aspects 1 through 4, further comprises: a remaining water amount acquirer configured to obtain a remaining water amount in the fuel cell at a start time of the fuel cell, wherein the operation controller sets a termination temperature to increase with an increase of the remaining water amount, wherein the termination temperature is a temperature of terminating the low-efficiency operation.

The fuel cell system of the Aspect 5 sets the higher value to the termination temperature with an increase of the remaining water amount in the fuel cell at the start time. This arrangement increases the heat value or amount of heat applied to the fuel cell itself during the low-efficiency operation and thereby facilitates discharge of water in the form of water vapor from the fuel cell even in the state of the high remaining water amount in the fuel cell.

[Aspect 6] In the fuel cell system described in any one of Aspects 1 through 5, further comprises: a temperature acquirer configured to obtain a fuel cell temperature or temperature of the fuel cell, wherein the operation controller sets a termination temperature or temperature of terminating the low-efficiency operation to increase with a decrease of the fuel cell temperature at a start time of the fuel cell.

In general, the lower fuel cell temperature at the start time causes the greater amount of water to remain in the fuel cell. The fuel cell system of the Aspect 6 sets the higher value to the termination temperature with a decrease of the fuel cell temperature at the start time. This arrangement increases the heat value or amount of heat applied to the fuel cell itself during the low-efficiency operation and thereby facilitates discharge of water in the form of water vapor from the fuel cell even in the state of the high remaining water amount in the fuel cell.

[Aspect 7] In the fuel cell system described in any one of Aspects 1 through 6, further comprises: a heat value requirement determiner configured to determine the required amount of heat for the fuel cell; and a temperature acquirer configured to obtain a fuel cell temperature or temperature of the fuel cell, wherein the operation controller continues performing the low-efficiency operation until the fuel cell temperature reaches a termination temperature or temperature of terminating the low-efficiency operation, the required amount of heat for the fuel cell includes a temperature-rise heat value requirement, wherein the temperature-rise heat value requirement is a required amount of heat to increase the fuel cell temperature, and when the fuel cell temperature is not lower than a preset temperature used as a criterion of detecting a vehicle drivable state but is lower than the termination temperature, the heat value requirement determiner determines the temperature-rise heat value requirement to decrease with an increase of the fuel cell temperature.

The fuel cell system of the Aspect 7 lowers the temperature rise rate of the fuel cell with an increase of the fuel cell temperature. This arrangement prevents the temperature of the fuel cell from increasing over the termination temperature of the low-efficiency operation, thus minimizing the unnecessary low-efficiency operation and improving the fuel consumption of the reactive gas.

[Aspect 8] In the fuel cell system described in the Aspect 7, the fuel cell system being mounted on a vehicle having an accelerator, the fuel cell system further comprising: a speed acquirer configured to obtain a vehicle speed or speed of the vehicle; and an accelerator opening acquirer configured to obtain an accelerator opening or opening degree of the accelerator, wherein when the fuel cell temperature is not lower than the preset temperature but is lower than the termination temperature, the heat value requirement determiner determines the temperature-rise heat value requirement to be not higher than at least one upper limit out of a vehicle speed-based upper limit and an accelerator opening-based upper limit, the vehicle speed-based upper limit is set to increase with an increase of the vehicle speed, and the accelerator opening-based upper limit is set to increase with an increase of the accelerator opening.

In general, the noise and vibration accompanied with the operation of the oxidizing gas supplier makes the driver feel more uncomfortable in the condition of the lower vehicle speed and in the condition of the greater accelerator opening. The fuel cell system of the Aspect 8 restricts the heat value requirement to or below at least one of the upper limit out of the vehicle speed-based upper limit and the accelerator opening-based upper limit, thus reducing the possibility that the driver feels uncomfortable due to the noise and vibration accompanied with the operation of the oxidizing gas supplier.

[Aspect 9] In the fuel cell system described in any one of Aspects 1 through 8, the fuel cell system being mounted on a vehicle, the fuel cell system further comprising: a deceleration request acquirer configured to obtain a deceleration request for the vehicle, wherein in response to the deceleration request, the gas supply flow regulator regulates the gas supply flow rate to achieve a variation of the regulated gas supply flow rate to be not higher than a preset level.

The fuel cell system of the Aspect 9 restricts the variation of the regulated gas supply flow rate to or below the preset level in the presence of a deceleration request. This arrangement effectively prevents the noise and vibration accompanied with the operation of the oxidizing gas supplier from increasing with a variation of the gas supply flow rate in spite of the deceleration request and from making the driver feel very uncomfortable.

BRIEF DESCRIPTION OF THE DRAWINGS

FIG. 11 is an explanatory graphical representation of exemplary settings of the first heat value limit map and the second heat value limit map shown in FIG. 9;

DESCRIPTION OF THE PREFERRED EMBODIMENT

A. First Embodiment

A1. System Configuration

Figure 1:
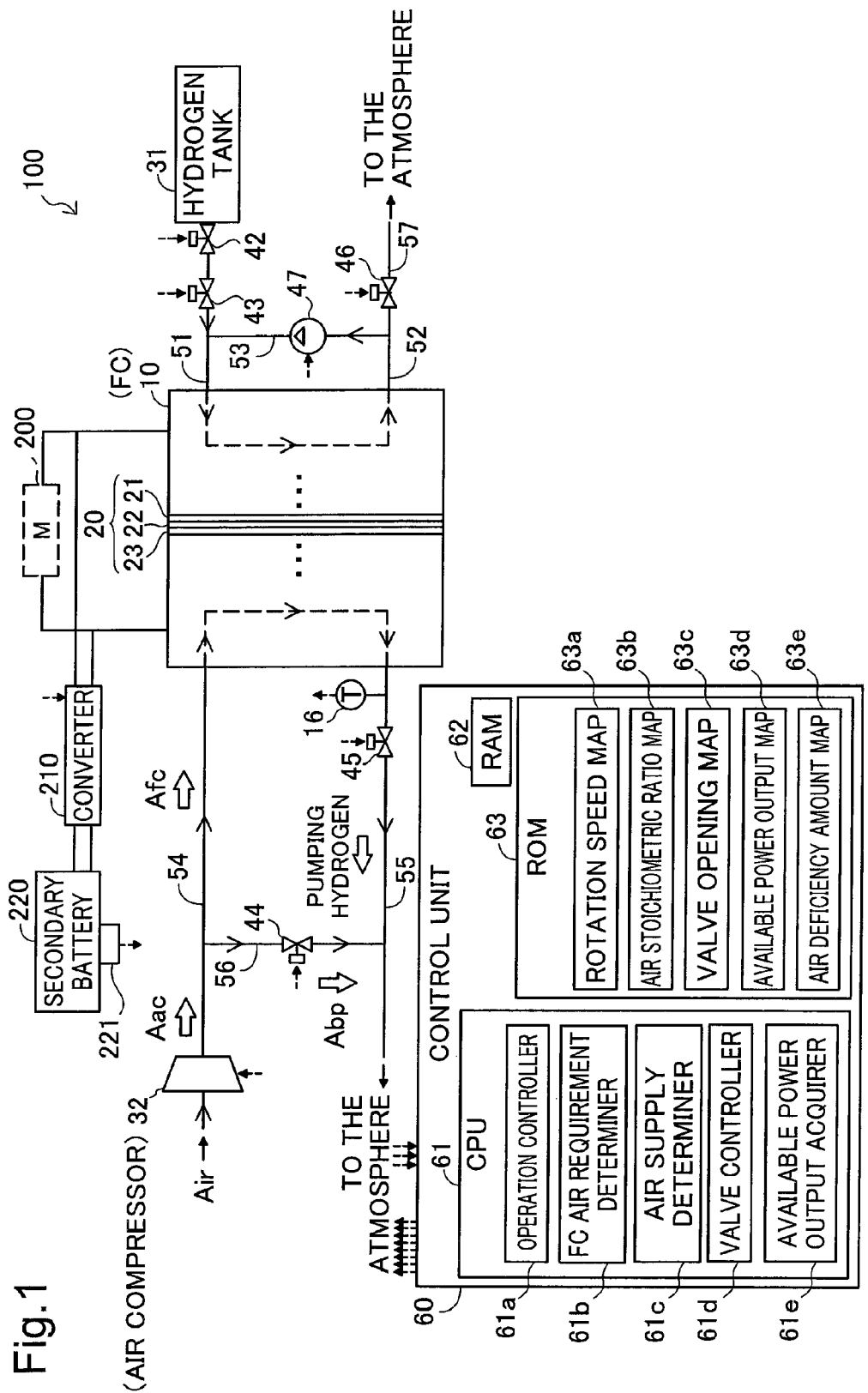
FIG. 1 is an explanatory diagrammatic representation of the general configuration of a fuel cell system in one embodiment of the invention.

FIG. 1 is an explanatory diagrammatic representation of the general configuration of a fuel cell system in one embodiment of the invention. The fuel cell system 100 of this embodiment is mounted on an electric vehicle to be used as a driving power supply system. The fuel cell system 100 includes a fuel cell stack 10, a hydrogen gas supply path 51, an anode off-gas exhaust path 52, a hydrogen gas bypass path 53, an air supply path 54, a cathode off-gas exhaust path 55, an air bypass path 56, a hydrogen tank 31, a shutoff valve 42, a hydrogen gas supply valve 43, a purge valve 46, a circulation pump 47, an air compressor 32, a pressure regulator 45, a bypass valve 44, a temperature sensor 16, a DC-DC converter 210, a secondary battery 220, an SOC estimator 221, and a control unit 60.

The fuel cell stack 10 is provided as a stack of a plurality of unit cells 20. The unit cell 20 includes an anode separator 21, an electrolyte membrane-containing MEA (membrane electrode assembly) 22, and a cathode separator 23. The MEA 22 is interposed between the anode separator 21 and the cathode separator 23.

The hydrogen gas supply path 51 is connected the hydrogen tank 31 with the fuel cell stack 10 and introduce hydrogen gas supplied from the hydrogen tank 31 into the fuel cell stack 10. The anode off-gas exhaust path 52 is discharged anode off-gas (excess hydrogen gas) from anodes of the fuel cell stack 10. The hydrogen gas bypass path 53 is connected the anode off-gas exhaust path 52 with the hydrogen gas supply path 51 and return the hydrogen gas discharged from the fuel cell stack 10 (i.e., hydrogen gas unconsumed by reaction) to the hydrogen gas supply path 51.

The air supply path 54 is connected the air compressor 32 with the fuel cell stack 10 and introduce the compressed air supplied from the air compressor 32 into the fuel cell stack 10. The cathode off-gas exhaust path 55 is discharged cathode off-gas from cathodes of the fuel cell stack 10. In normal operation condition, the cathode off-gas includes the excess air unconsumed by the electrochemical reaction in the fuel cell stack 10 and water produced by the electrochemical reaction in the fuel cell stack 10. In low-efficiency operation condition, the cathode off-gas includes hydrogen produced by chemical reaction expressed by Chemical Equation (1) given below (hereafter referred to as "pumping hydrogen") on the cathodes during low-efficiency operation, in addition to the excess air and the produced water. In this embodiment, the "low-efficiency operation" means operation with the lowered power generation efficiency than the normal operation (where the fuel cell stack 10 is operated at an operating point on an I-V characteristic curve).

$$2H^+ + 2e^- \rightarrow H_2 \quad (1)$$

The air bypass path 56 is arranged to connect the air supply path 54 with the cathode off-gas exhaust path 55 and introduce the air supplied from the air compressor 32 to the cathode off-gas exhaust path 55 not via the fuel cell stack 10.

The hydrogen tank 31 stores high-pressure hydrogen gas. The shutoff valve 42 is located at a hydrogen gas outlet (not shown) of the hydrogen tank 31 to start and stop the supply of hydrogen gas. The hydrogen gas supply valve 43 is located in the hydrogen gas supply path 51. The pressure and the flow rate of the hydrogen gas supplied to the fuel cell stack 10 are adjustable by regulating the valve opening of the hydrogen gas supply valve 43. The purge valve 46 is operated to release the anode off-gas discharged through the anode off-gas exhaust path 52 to the atmosphere. The circulation pump 47 is located in the hydrogen gas bypass path 53 to introduce the hydrogen gas from the anode off-gas exhaust path 52 to the hydrogen gas supply path 51.

The air compressor 32 is located in the air supply path 54 to pressurize the externally intake air and supply the pressurized air to the fuel cell stack 10. The air compressor 32 may be, for example, a centrifugal compressor utilizing the impeller rotation for air compression or an axial-flow compressor utilizing the rotor (rotor blade) rotation for air compression. The driving power for the air compressor 32 is supplied from the fuel cell stack 10. The pressure regulator 45 is operated to regulate the pressure (back pressure) of the fuel cell stack 10. The bypass valve 44 is located in the air bypass path 56 to regulate the amount of the air introduced from the air supply path 54 to the cathode off-gas exhaust path 55. The temperature sensor 16 is located close to the fuel cell stack 10 in the cathode off-gas exhaust path 55. In this embodiment, the temperature measured by the temperature sensor 16 is taken as the temperature of the fuel cell stack 10 and as the temperature of the secondary battery 220.

The DC-DC converter 210 is connected with both the secondary battery 220 and the fuel cell stack 10 and serves to increase a DC voltage supplied from the secondary battery 220 and output the increased voltage to a load via an inverter (not shown). In this embodiment, the load includes a drive motor 200 for the electric vehicle and auxiliary machinery, such as the air compressor 32 and the circulation pump 47. The DC-DC converter 210 also serves to lower the voltage of electric power generated by the fuel cell stack 10 and charge the secondary battery 220 with the electric power of the lowered voltage. The secondary battery 220 may be any of various batteries, for example, a nickel-cadmium battery, a nickel-hydrogen battery, or a lithium secondary battery. The SOC estimator 221 estimates the state of charge (SOC) of the secondary battery 220.

The control unit 60 is electrically connected with the air compressor 32, the DC-DC converter 210, and the valves 42 through 47 to control the operations of these components. The control unit 60 is also electrically connected with the temperature sensor 16 and the SOC estimator 221 to receive the measurements and estimations from these components.

The control unit 60 includes a CPU (central processing unit) 61, a RAM (random access memory) 62, and a ROM (read only memory) 63. The ROM 63 stores a control program (not shown) executed to control the operations of the fuel cell system 100. The CPU 61 executes this control program with the use of the ROM 62 to serve as an operation controller 61a, a fuel cell (FC) air requirement determiner 61b, an air supply determiner 61c, a valve controller 61d, and an available power output acquirer 61e.

The operation controller 61a regulates the amounts of reactive gases (air and hydrogen gas) supplied to the fuel cell stack 10 and the voltage of the fuel cell stack 10 to control the power output (amount of power generation) and the heat value of the fuel cell stack 10. The amount of the air is regulated by adjusting the rotation speed of the air compressor 32. The flow rate of hydrogen gas is regulated by adjusting the valve opening of the hydrogen gas supply valve 43 via the valve controller 61d. The power control of the fuel cell stack 10 is performed via the DC-DC converter 210. The operation controller 61a calculates a power output requirement or required amount of power output for the fuel cell stack 10 from the accelerator opening and the vehicle speed (not shown).

A rotation speed map 63a, an air stoichiometric ratio map 63b, a valve opening map 63c, an available power output map 63d, and an air deficiency amount map 63e are stored in advance in the ROM 63. The rotation speed map 63a correlates the impeller rotation speed of the air compressor 32 with the air supply or supplied amount of the air of the air compressor 32 and is experimentally or otherwise set in advance.

Figure 2:
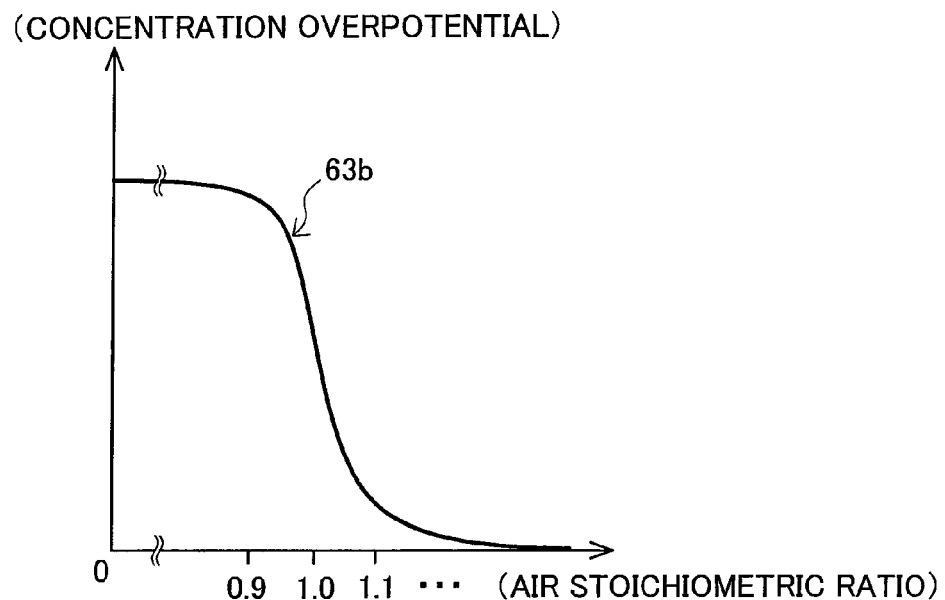
FIG. 2 is an explanatory graphical representation of exemplary setting of the air stoichiometric ratio map 63b shown in FIG. 1.

FIG. 2 is an explanatory graphical representation of exemplary setting of the air stoichiometric ratio map 63b shown in FIG. 1. The map of FIG. 2 is set with air stoichiometric ratio as abscissa and with concentration overpotential as ordinate. In the low-efficiency operation condition, the fuel cell system 100 adopts a known method of restricting the air supply to the fuel cell stack 10 to generate the concentration overpotential and thereby increase the amount of waste heat of the fuel cell stack 10. The relation of the concentration overpotential to the air stoichiometric ratio in the low-efficiency operation condition is experimentally or otherwise determined in advance. The "air stoichiometric ratio" means a ratio of the amount of the air actually supplied to the fuel cell stack 10 to the theoretical air requirement or theoretically required amount of the air for operating each of the unit cells 20 included in the fuel cell stack 10 at an operating point on the I-V characteristic curve. As shown in FIG. 2, the higher air stoichiometric ratio (i.e., the greater air supply) gives the lower concentration overpotential, and the concentration overpotential abruptly decreases at the air stoichiometric ratio in a range of 0.9 to 1.1.

The valve opening map 63c shown in FIG. 1 correlates the amounts of the air with the valve openings of the bypass valve 44 and the pressure regulator 45. The greater valve opening of the bypass valve 44 gives the greater amount of the air in the air bypass path 56. The greater valve opening of the pressure regulator 45 gives the greater amount of the air in the air supply path 54 and the greater amount of the air in the cathode off-gas exhaust path 55. In the fuel cell system 100, the relations of the amounts of the air to the valve openings of the bypass valve 44 and the pressure regulator 45 are experimentally determined in advance and are stored in the ROM 63. The available power output map 63d correlates the state of charge (SOC) of the secondary battery 220 and the temperature of the secondary battery 220 with the available maximum power output from the secondary battery 220. The higher SOC of the secondary battery 220 gives the greater available power output, and the higher temperature of the secondary battery 220 also gives the greater available power output. The relations of the available power output or available amount of power output to the SOC of the secondary battery 220 and to the temperature of the secondary battery 220 are experimentally determined in advance and are stored in the form of the available power output map 63d in the ROM 63.

Figure 3:
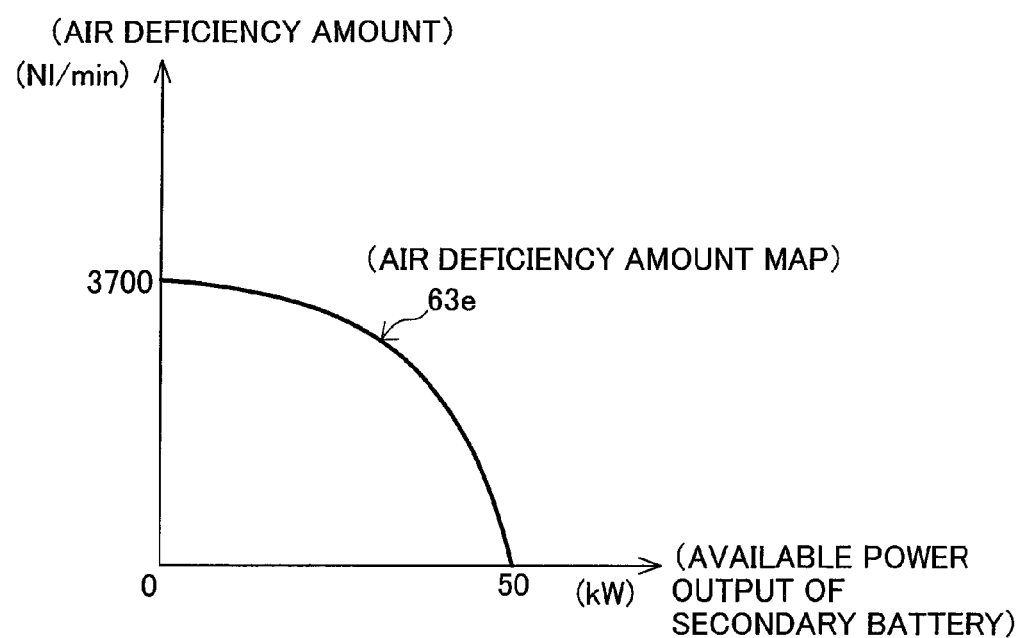
FIG. 3 is an explanatory graphical representation of exemplary settings of the air deficiency amount map 63e shown in FIG. 1.

FIG. 3 is an explanatory graphical representation of exemplary settings of the air deficiency amount map 63e shown in FIG. 1. The map of FIG. 3 is set with available power output of the secondary battery 220 as abscissa and with air deficiency amount in the air supply from the air compressor 32 as ordinate.

In the low-temperature environment, since the secondary battery 220 has a relatively low level of the available power output, there may be failed supply of a power output requirement or required amount of power output to meet a preset air supply response, to the air compressor 32. In this embodiment, an increase of air supply to 3700 NI (normal litter)/min as the maximum air supply in 1 second is the preset air supply response. The maximum air supply response raises the air supply from 0 NI/min to 3700 NI/min in 1 second, in response to the driver's accelerator operation from the idling state (with an accelerator opening of 0%) to the maximum accelerator-on state (with an accelerator opening of 100%) in the condition of no air supply to the fuel cell stack 10. It is here assumed that the electric power required for driving the air compressor 32 to meet this maximum response is 50 kW. The maximum air supply response is not achievable when the available power output of the secondary battery 220 determined according to the SOC and the temperature of the secondary battery 220 is 40 kW. The maximum air supply response is achievable, on the other hand, when the determined available power output of the secondary battery 220 is equal to or over 50 kW. The fuel cell system 100 experimentally or otherwise determines the relation between the available power output of the secondary battery 220 and the air deficiency amount (NI/min) to meet the preset air supply response in the condition of no air supply to the fuel cell stack 10 and sets the determined relation in the form of the air deficiency amount map 63e.

As shown in the air deficiency amount map 63e of FIG. 3, the air deficiency amount decreases with an increase in available power output of the secondary battery 220 and reaches zero at the available power output of the secondary battery 220 equal to or greater than 50 kW. This means that the increase of air supply to 3700 NI/min as the maximum air supply in 1 second is achievable in response to the driver's accelerator operation to the accelerator opening of 100% in the condition of no air supply from the air compressor 32, when the available power output of the secondary battery 220 is at least 50 kW. The air deficiency amount is 3700 NI/min at the available power output of the secondary battery 220 equal to 0 kW. This means that 3700 NI/min is deficient in the air supply when the available power output of the secondary battery 220 is 0 kW.

In the condition of air supply from the air compressor 32, the preset air supply response may be achieved even when the secondary battery 220 has a relatively low level of the available power output. For example, when the air supply requirement or required amount of air supply to be raised in 1 second in response to the accelerator operation to the accelerator opening of 100% is 1000 Nl/min due to the air supply from the air compressor 32, even the available power output of the secondary battery 220 below 50 kW may meet the preset air supply response (i.e., the increase of air supply to 3700 Nl/min in 1 second). The air supply of 3700 Nl/min and the time of 1 second in this illustrated example respectively correspond to the preset gas flow rate and the preset time period in the claims of the invention. The preset air supply response is not restricted to the increase of air supply to 3700 Nl/min in 1 second but may be any arbitrary air supply response to increase the air supply to any arbitrary gas flow rate in any arbitrary time period.

The fuel cell system 100 includes a mechanism for cooling down the fuel cell stack 10 with a cooling medium (for example, a cooling medium circulation path and a radiator), in addition to the components discussed above. The fuel cell system 100 further includes a heating mechanism (not shown) to heat up the passenger compartment of the vehicle by utilizing the cooling medium heated by the fuel cell stack 10.

On the start of the fuel cell system 100, when the temperature of the fuel cell stack 10 is lower than 0° C., the fuel cell system 100 initiates the low-efficiency operation to warm up the fuel cell stack 10.

In the state that the temperature of the fuel cell stack 10 is lower than 0° C., the electric vehicle equipped with the fuel cell system 100 is made non-drivable to keep the running stability. The electric vehicle is made drivable when the temperature of the fuel cell stack 10 is increased to or above 0° C. in the course of the low-efficiency operation. In the state that the temperature of the fuel cell stack 10 is lower than 0° C., the low-efficiency operation is performed to lower the output response (the performance of outputting electric power to meet a power output requirement or required amount of power output, or the shortest possible time period to meet the power output requirement) and increase the heat value, so as to make the electric vehicle drivable within a minimum possible time. When the temperature of the fuel cell stack 10 increases to 0° C., the fuel cell system 100 continues the low-efficiency operation and performs an air supply control process (discussed later) to improve the output response and the heat generation response of the fuel cell stack 10. In this embodiment, the "heat generation response" means the performance of meeting a heat value requirement or required amount of heat, or the shortest possible time period to actually meet the heat value requirement.

The air compressor 32 of this embodiment corresponds to the oxidizing gas supplier in the claims of the invention. The bypass valve 44 and the pressure regulator 45 of this embodiment correspond to the flow control valve in the claims of the invention. The SOC estimator 221 and the temperature sensor 16 of this embodiment respectively correspond to the available power output acquirer and the temperature acquirer in the claims of the invention. The operator controller 61a of this embodiment corresponds to the gas supply flow regulator, the operation controller, the remaining water amount acquirer, the heat value requirement determiner, the speed acquirer, the accelerator opening acquirer, and the deceleration request acquirer in the claims of the invention.

A2. Air Supply Control Process

When the temperature of the fuel cell stack 10 is increased to 0° C. in the course of the low-efficiency operation on the start and the electric vehicle is made drivable, the fuel cell system 100 activates an air supply control process.

Figure 4:
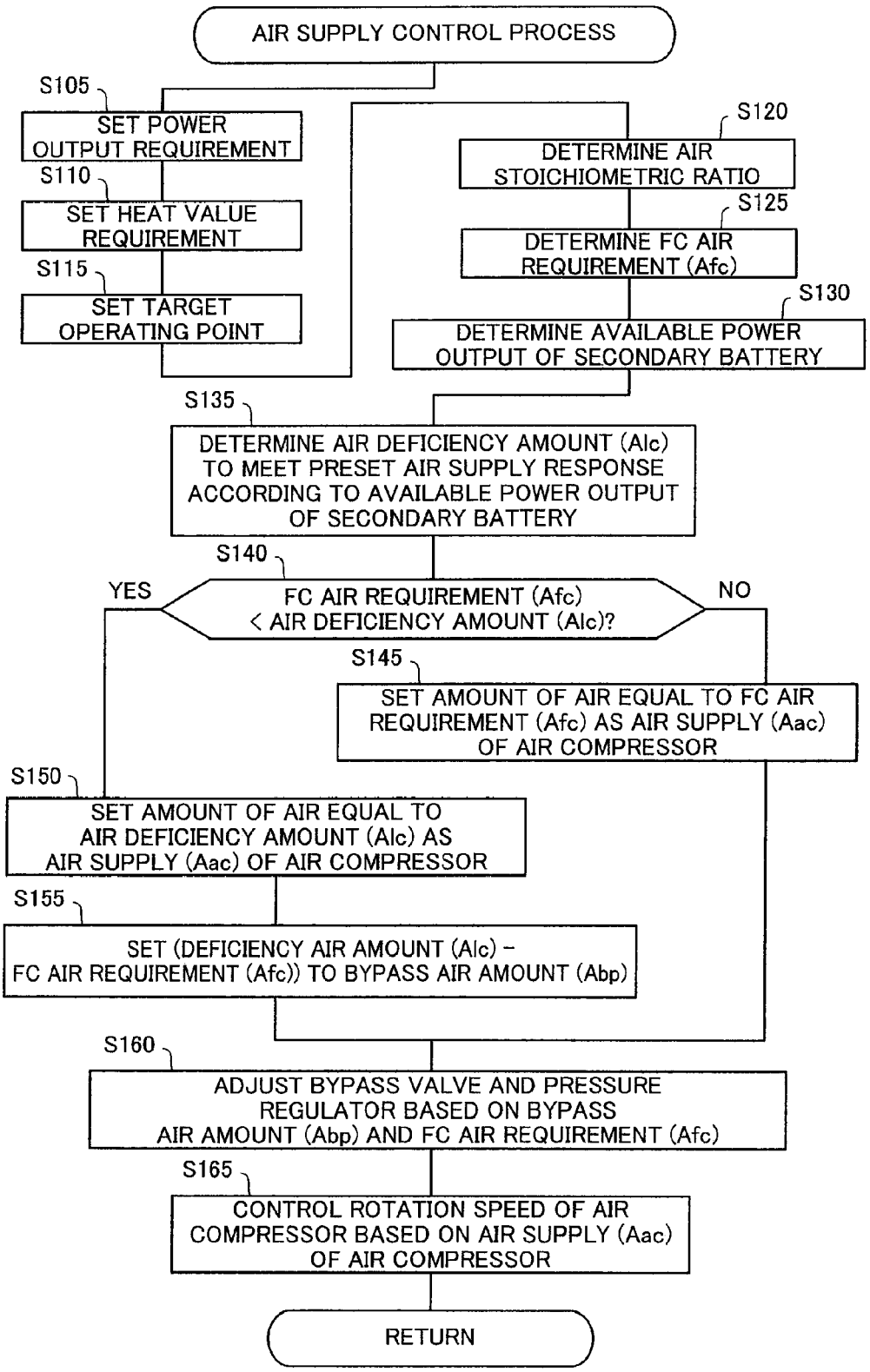
FIG. 4 is a flowchart of one exemplary flow of air supply control process performed in this embodiment.

FIG. 4 is a flowchart of one exemplary flow of air supply control process performed in this embodiment. The operation controller 61a sets a total power output requirement for the drive motor 200 and the auxiliary machinery, based on the accelerator opening (not shown) and the speed of the electric vehicle (step S105) and subsequently sets a heat value requirement (step S110). In this embodiment, the result of subtraction (hereafter referred to as "maximum heat value") of auxiliary machinery-based loss (i.e., the amount of power supply to the auxiliary machinery) from the maximum generable energy of the fuel cell stack 10 is set in advance as the heat value requirement in the low-efficiency operation. The operation controller 61a accordingly sets this maximum heat value to the heat value requirement. The operation controller 61a subsequently sets a target operating point of the fuel cell stack 10 (step S115).

Figure 5:
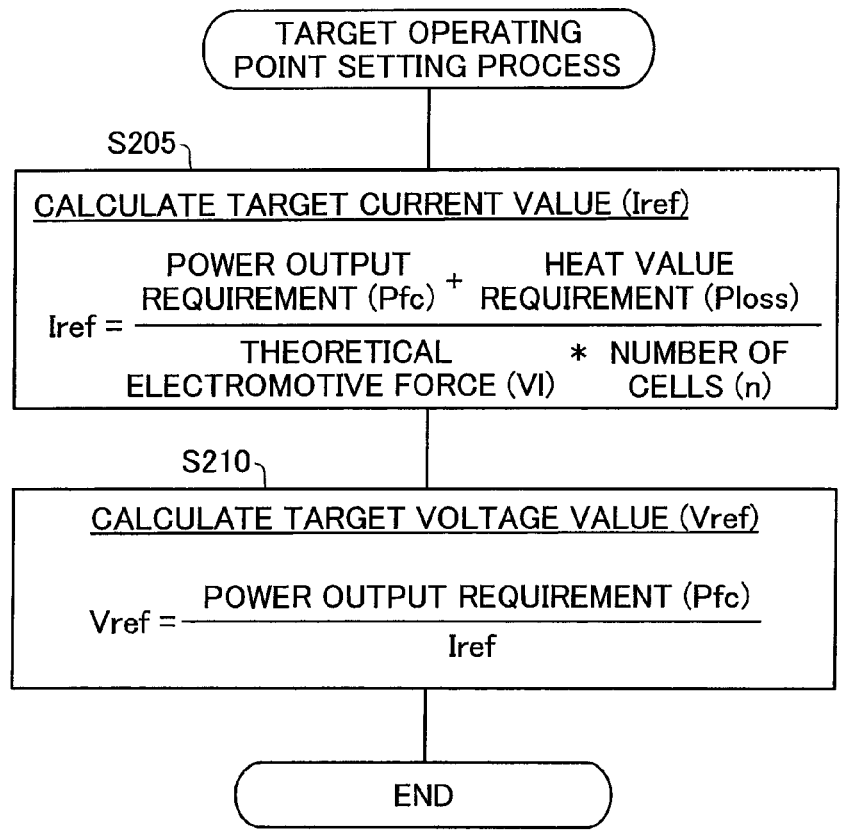
FIG. 5 is a flowchart of one exemplary flow of target operating point setting process.

FIG. 5 is a flowchart of one exemplary flow of target operating point setting process. The operation controller 61a calculates a current value (target current value) Iref at a target operating point according to Equation (2) given below (step S205):

$$Iref=(Pfc+Ploss)/VT*n \quad (2)$$

In Equation (2), "Pfc", "Ploss", "VT", and 'n' respectively represent the power output requirement, the heat value requirement, the theoretical electromotive force per unit cell, and the number of the unit cells 20 included in the fuel cell stack 10.

The operation controller 61a subsequently calculates a voltage value (target voltage value) Vref at the target operating point according to Equation (3) given below (step S210):

$$Vref=Pfc/Iref \quad (3)$$

In Equation (3), Pfc and Iref represent the same as those in Equation (2).

Referring back to FIG. 4, after setting the target operating point, the operation controller 61a refers to the air stoichiometric ratio map 63b to determine the air stoichiometric ratio according to the concentration overpotential (step S120).

Figure 6:
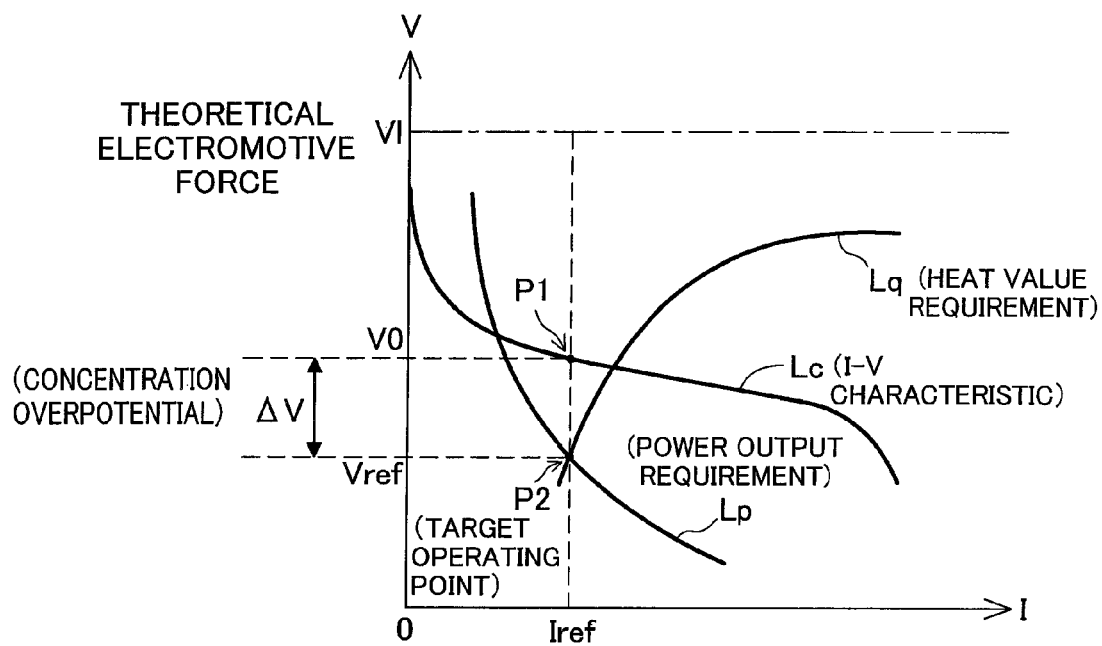
FIG. 6 is an explanatory graphical representation of determining the concentration overpotential.

FIG. 6 is an explanatory graphical representation of determining the concentration overpotential. The map of FIG. 6 is set with current value of the fuel cell stack 10 as abscissa and voltage value of the fuel cell stack 10 as ordinate. In the map of FIG. 6, a curve Lc represents an I-V characteristic curve (current-voltage characteristic curve) of the fuel cell stack 10. A curve Lq represents an equal heat value curve of a certain heat value requirement. A curve Lp represents an equal power curve of a certain power output requirement.

An operating point P2 shown in FIG. 6 meets both the power output requirement (curve Lp) and the heat value requirement (curve Lq) and is accordingly set as the target operating point at step S115. Another operating point P1 is on the I-V characteristic curve of the fuel cell stack 10 and meets the target current value Iref. The concentration overpotential is obtained as a difference between voltage V0 at the operating point P1 and voltage Vref at the target operating point P2. The operation controller 61a refers to the air stoichiometric ratio map 63b shown in FIG. 2 to determine the air stoichiometric ratio according to the concentration overpotential thus obtained.

The operation controller 61a controls the FC air requirement determiner 61b to determine an air requirement Afc or required amount of the air for the fuel cell stack 10 (hereafter referred to as "FC air requirement") according to Equation (4) given below (step S125):

$$Afc=Iref*(n*22.4*60/4*96500*0.21)*(\text{air stoichiometric ratio}) \quad (4)$$

In Equation (4), the constant "n", the constant "22.4", the constant "60", the constant "96500", and the constant "0.21" respectively denote the number of the unit cells 20 included in the fuel cell stack 10, a factor used to convert the amount of the air (mole) to the volume of the air (liter), a factor used to convert the minute to the second, the Faraday constant, and the oxygen content in the air. The air stoichiometric ratio determined at step S120 is used as the air stoichiometric ratio in Equation (4).

The operation controller 61a refers to the available power output map 63d to determine the available power output of the secondary battery 220 according to the state of charge (SOC) received from the SOC estimator 221 and the temperature received from the temperature sensor 16 (i.e., the temperature of the secondary battery 220) (step S130).

The operation controller 61a subsequently refers to the air deficiency amount map 63e to determine an air deficiency amount Alc according to the available power output determined at step S130 (step S135).

The operation controller 61a then compares the FC air requirement Afc determined at step S125 with the air deficiency amount Alc determined at step S135 and determines whether the FC air requirement Afc is less than the air deficiency amount Alc (step S140).

When the FC air requirement Afc is not less than the air deficiency amount Alc (step S140: No), the operation controller 61a controls the air supply determiner 61c to set the amount of the air equal to the FC air requirement Afc as an air supply Aac or supplied amount of the air of the air compressor 32 (hereafter simply referred to as "air supply Aac") (step S145).

After setting the air supply Aac at step S145, the operation controller 61a controls the valve controller 61d to adjust the bypass valve 44 and the pressure regulator 45 based on the amount of the air in the air bypass path 56 (hereafter referred to as "bypass air amount Abp") and the FC air requirement Afc (step S160). The adjustment of step S160 is also performed after the setting of step S155 (discussed later). At step S160 performed after the setting of step S145, the operation controller 61a sets 0 to thr bypass air amount Abp and adjusts the opening of the bypass valve 44 to 0%. One alternative procedure may estimate the generation amount of the pumping hydrogen in the fuel cell stack 10 and the amount of the air required for dilution of the pumping hydrogen and may adjust the opening of the bypass valve 44 to make the estimated amount of the air for dilution flow in the air bypass path 56. In this case, the sum of the FC air requirement Afc and the estimated amount of the air for dilution is set to the air supply Aac.

The operation controller 61a refers to the rotation speed map 63a to determine the rotation speed of the air compressor 32 according to the air supply Aac set at step S145 and controls the air compressor 32 to achieve the determined rotation speed (step S165). The control of step S165 achieves the supply of the FC air requirement Afc to the fuel cell stack 10. The FC air requirement Afc is greater than the air deficiency amount determined according to the available power output of the secondary battery 220. When 3700 Nl/min is newly set to the FC air requirement Afc in response to the accelerator operation to the accelerator opening of 100%, increasing the power output of the secondary battery 220 achieves the newly set FC air requirement Afc within 1 second.

On determination at step S140 that the FC air requirement Afc is less than the air deficiency amount Alc, the operation controller 61a sets the amount of the air equal to the air deficiency amount Alc determined at step S135 as the air supply Aac (step S150). In this case, the air supply Aac supplied from the air compressor 32 becomes greater than the FC air requirement Afc. The operation controller 61a accordingly sets the amount of the air corresponding to the difference between the air deficiency amount Alc and the FC air requirement Afc to the bypass air amount Abp (step S155). The operation controller 61a then executes the adjustments of steps S160 and S165 discussed above. One alternative procedure may estimate the amount of the air required for dilution of the pumping hydrogen and add the estimated amount of the air for dilution to the bypass air amount Abp set at step S155 so as to determine the bypass air amount Abp. In this case, the sum of the air deficiency amount Alc and the estimated amount of the air for dilution is set to the air supply Aac.

When the FC air requirement Afc is less than the air deficiency amount Alc, the series of processing of steps S150 to S165 is performed to supply the air deficiency amount Alc from the air compressor 32, achieve the FC air requirement Afc supplied to the fuel cell stack 10, and enable the amount of the air corresponding to the difference between the air deficiency amount Alc and the FC air requirement Afc to be supplied to the air bypass path 56. When 3700 Nl/min is newly set to the FC air requirement Afc in response to the accelerator operation to the accelerator opening of 100%, setting 0 to the bypass air amount Abp and adding the amount of the air equivalent to the bypass air amount Abp to the FC air requirement Afc enable the air deficiency amount Alc determined according to the available power output of the secondary battery 220 to be compensated by the air supply Aac. This achieves the preset air supply response.

Figure 7:
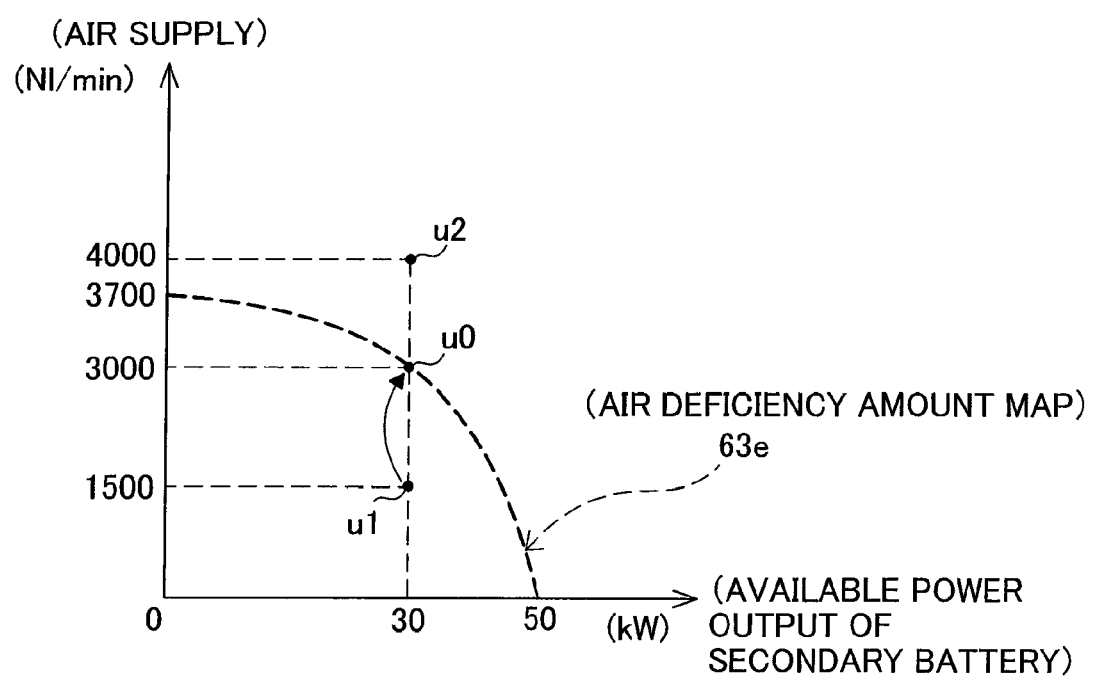
FIG. 7 is an explanatory graphical representation of exemplary settings of the air supply of the air compressor in the air supply control process of the embodiment.

FIG. 7 is an explanatory graphical representation of exemplary settings of the air supply of the air compressor in the air supply control process of the embodiment. The map of FIG. 7 is set with available power output of the secondary battery 220 as abscissa and air supply of the air compressor 32 as ordinate. For the convenience of explanation, the air deficiency amount map 63e of FIG. 3 is shown as a broken line curve in FIG. 7.

In one example, when the available power output of the secondary battery 220 is 30 kW and the FC air requirement to meet the target operating point is 4000 Nl/min (operating point u2), this FC air requirement is greater than the air deficiency amount (3000 Nl/min) at this available power output (30 kW). In this case, when 3700 Nl/min is newly set to the FC air requirement Afc in response to the accelerator operation to the accelerator opening of 100%, setting the FC air requirement of 4000 Nl/min as the air supply Aac enables the FC air requirement Afc of 3700 Nl/min to be achieved within 1 second and thereby meets the preset air supply response.

In another example, when the available power output of the secondary battery 220 is 30 kW and the FC air requirement to meet the target operating point is 1500 Nl/min (operating point u1), this FC air requirement is less than the air deficiency amount (3000 Nl/min) at this available power output (30 kW). The air supply control is, however, performed to operate the air compressor 32 at an operating point u0 with setting the air deficiency amount of 3000 Nl/min as the air supply Aac. When 3700 Nl/min is newly set to the FC air requirement Afc in response to the accelerator operation to the accelerator opening of 100%, the air supply control enables the FC air requirement Afc of 3700 Nl/min to be achieved within 1 second and thereby meets the preset air supply response.

As described above, when the FC air requirement Afc is less than the air deficiency amount Alc, the fuel cell system 100 of the embodiment sets the air deficiency amount Alc as the air supply of the air compressor 32 and supplies the gas flow corresponding to the difference between the air deficiency amount Alc and the FC air requirement Afc to the air bypass path 56. Such air supply control assures the achievement of the preset air supply response in the fuel cell system 100 in response to the subsequent accelerator operation to the accelerator opening of 100% and thereby improves the output response and the heat generation response of the fuel cell stack 10. In the low-efficiency operation performed with supply of electric power from the fuel cell stack 10 to the drive motor 200, the load significantly changes with a variation of the accelerator opening. This may cause an abrupt variation of the FC air requirement Afc. The configuration of this embodiment can, however, achieve an abrupt increase of the FC air requirement Afc in response to an abrupt increase of the load even in the state of the low available power output of the secondary battery 220 in the low-temperature environment, thus improving the output response and the heat generation response.

The air supply control process of the embodiment supplies the gas flow corresponding to the difference between the air deficiency amount Alc and the FC air requirement Afc to the air bypass path 56. The minimum possible air supply to achieve the preset air supply response can thus be set to the air supply of the air compressor 32. This arrangement does not set any excess amount of the air to the air supply of the air compressor 32 and thus effectively minimizes the unnecessary power consumption.

The air deficiency amount map sets the air deficiency amount at each level of the available power output of the secondary battery 220. The application of this air deficiency amount map assures the more accurate determination of the air deficiency amount, compared with the procedure of uniformly setting a fixed value to the air deficiency amount. In the state where the FC air requirement Afc is less than the air deficiency amount Alc, this arrangement does not set any excess amount of the air to the air supply of the air compressor 32 and thus effectively minimizes the unnecessary power consumption.

In the state where the FC air requirement Afc is not less than the air deficiency amount Alc, on the other hand, the air supply control process sets the FC air requirement Afc as the air supply Aac of the air compressor 32. Such setting assures achievement of the preset air supply response in the fuel cell system 100 in response to the subsequent accelerator operation to the accelerator opening of 100%. In this state, the air supply control process skips the settings of steps S150 and S155. This arrangement effectively simplifies the processing flow, compared with the procedure of unconditionally performs the settings of steps S150 and S155 regardless of the level of the air deficiency amount Alc.

B. Second Embodiment

Figure 8:
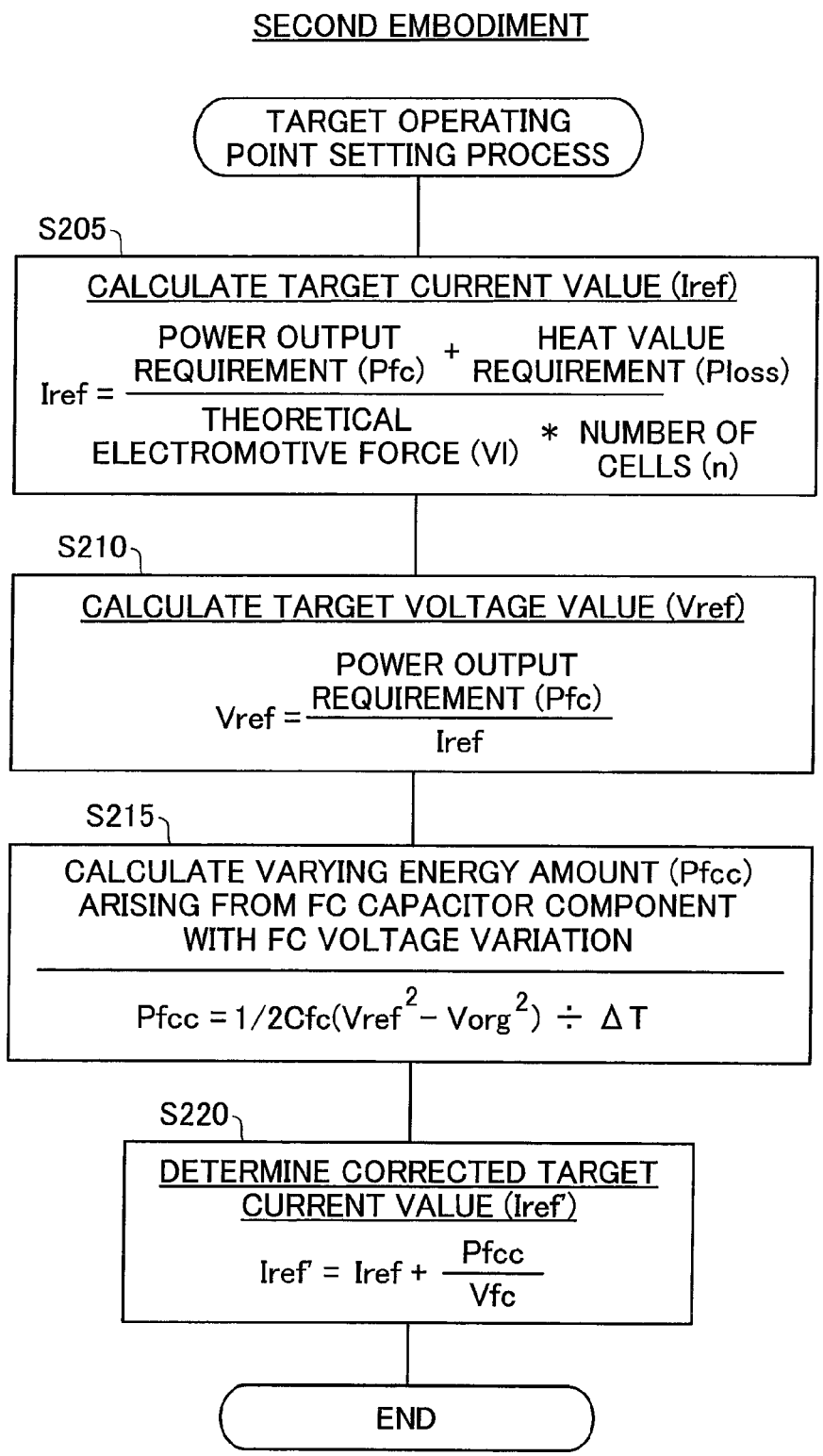
FIG. 8 is a flowchart showing another exemplary flow of target operating point setting process performed in a second embodiment.

FIG. 8 is a flowchart showing another exemplary flow of target operating point setting process performed in a second embodiment. A fuel cell system of the second embodiment has the similar configuration to that of the fuel cell system 100 of the first embodiment shown in FIG. 1, except addition of steps S215 and S220 to the target operating point setting process.

The fuel cell stack 10 generally has the capacity of a capacitor component (capacitance) including a capacitance induced by an electric double layer at the interface between an electrolytic solution and a catalyst carrier and an apparent capacitance induced by the redox reaction of a catalyst. The capacitor component of the fuel cell stack 10 may cause errors in the power output (amount of electric power) and the heat value of the fuel cell stack 10. More specifically, in the case of an abrupt increase of the voltage of the fuel cell stack 10 to drive the fuel cell stack 10 at a newly set target operating point, the capacitor component of the fuel cell stack 10 absorbs energy. Such energy absorption enables the fuel cell stack 10 to be driven at a different operating point from the newly set target operating point. In the case of an abrupt decrease of the voltage of the fuel cell stack 10, on the other hand, the capacitor component of the fuel cell stack 10 releases energy. In this state, the fuel cell stack 10 can also be driven at a different operating point from the newly set target operating point. Driving the fuel cell stack 10 at a different operating point from the target operating point lowers the output response and the heat generation response of the fuel cell stack 10. The procedure of the second embodiment sets the target operating point by taking into account the capacitor component of the fuel cell stack 10, in order to improve the output response and the heat generation response of the fuel cell stack 10.

Referring to the concrete processing flow of FIG. 8, after calculating the target current value Iref and the target voltage value Vref at steps S205 and S210, the operation controller 61a calculates a varying energy amount Pfcc arising from the capacitor component of the fuel cell stack 10 with a voltage variation according to Equation (5) given below (step S215):

$$Pfcc = \tfrac{1}{2} Cfc^* (Vref^2 - Vorg^2)/\Delta T \tag{5}$$

In Equation (5), Cfc represents the capacitor component (capacitance) of the fuel cell stack 10 and Vorg represents the voltage value at a present operating point. In Equation (5), $\Delta T$ represents a time period preset in the fuel cell system 100 as a required time (voltage control response) to vary the voltage from the voltage value at the present operating point to the voltage value at the target operating point and may be set equal to, for example, "1 second".

The operation controller 61a corrects the target current value Iref with the varying energy amount Pfcc calculated at step S215 according to Equation (6) given below to determine a corrected target current value Iref (step S220):

$$Iref = Iref + Pfcc/Vorg \tag{6}$$

In Equation (6), Iref and Vorg represent the same as those in Equation (5).

For example, in the state of a voltage increase, the capacitor component of the fuel cell stack 10 absorbs energy. Setting a higher value than the target current value at the original target operating point to the corrected target current value increases the power output by an amount of electric power corresponding to the absorbed energy and thereby cancels out the absorbed energy amount (varying energy amount). The second term on the right side of Equation (6) gives the current value to cancel out the varying energy. The target operating point setting process of this embodiment sets the operating point defined by the combination of the voltage value Vref and the corrected current value Iref to a new target operating point.

The fuel cell system of the second embodiment having the configuration discussed above has the similar effects and advantages to those of the fuel cell system 100 of the first embodiment. The fuel cell system of the second embodiment additionally corrects the target current value to cancel out the varying energy amount arising from the capacitor component (capacitance) of the fuel cell stack 10 with a voltage variation. Even in the state of an energy variation arising from the capacitor component of the fuel cell stack 10, this arrangement enables the fuel cell stack 10 to be driven at the original target operating point and thereby improves the output response and the heat generation response of the fuel cell stack 10.

C. Third Embodiment

Figure 9:
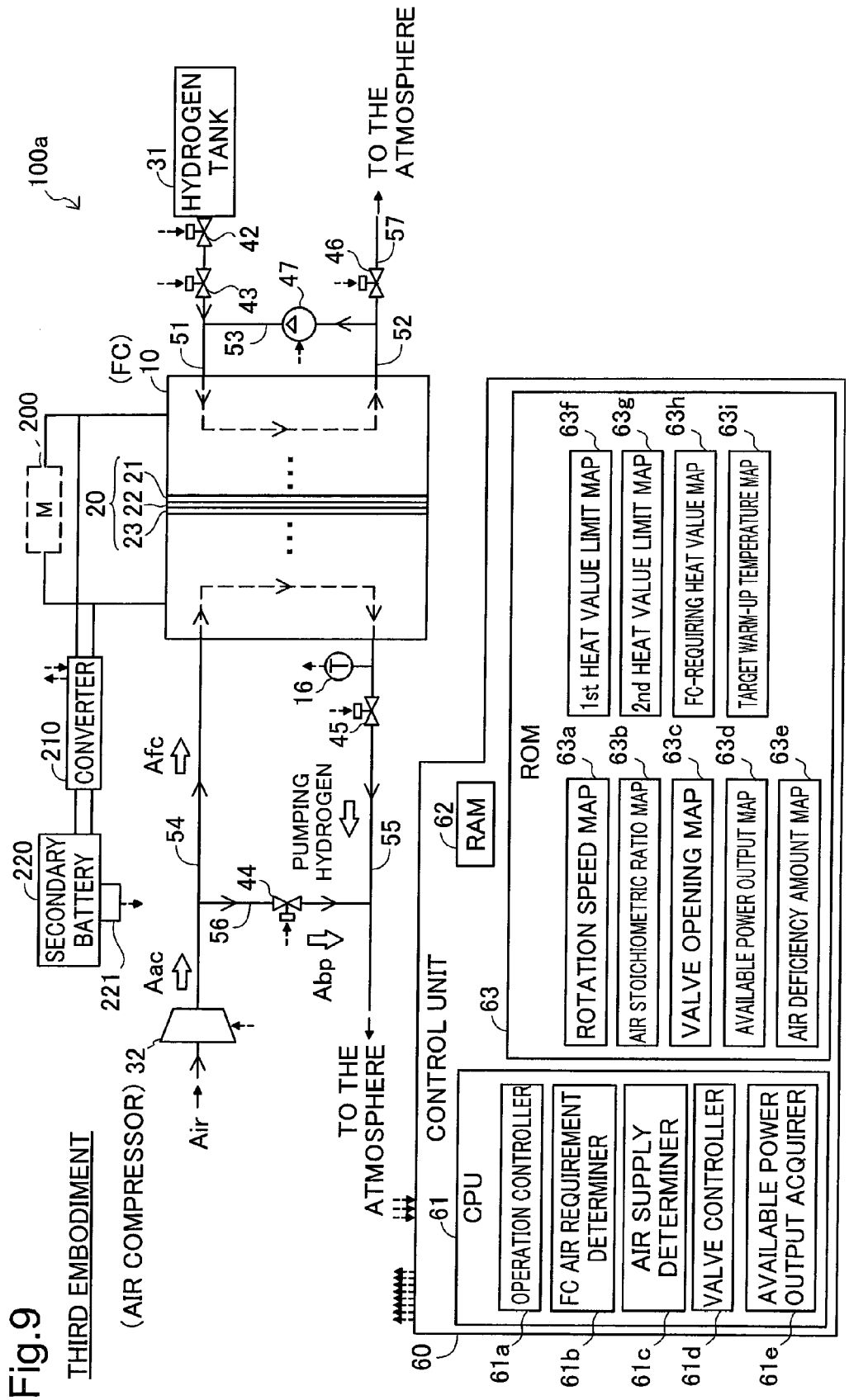
FIG. 9 is an explanatory diagrammatic representation of the general configuration of a fuel cell system in a third embodiment.

FIG. 9 is an explanatory diagrammatic representation of the general configuration of a fuel cell system in a third embodiment. The fuel cell system 100a of the third embodiment has the similar configuration to that of the fuel cell system 100 of the first embodiment shown in FIG. 1, except storage of a first heat value limit map 63f, a second heat value limit map 63g, an FC-requiring heat value map 63h, and a target warm-up temperature map 63i in the ROM 63. The details of these maps 63f to 63i will be described later.

The air supply control of the first embodiment sets the maximum heat value of the fuel cell stack 10 as the heat value requirement in the low-efficiency operation. The air supply control of the third embodiment, on the other hand, sets the heat value requirement according to the temperature of the fuel cell stack 10 and the available power output of the fuel cell stack 10.

Figure 10:
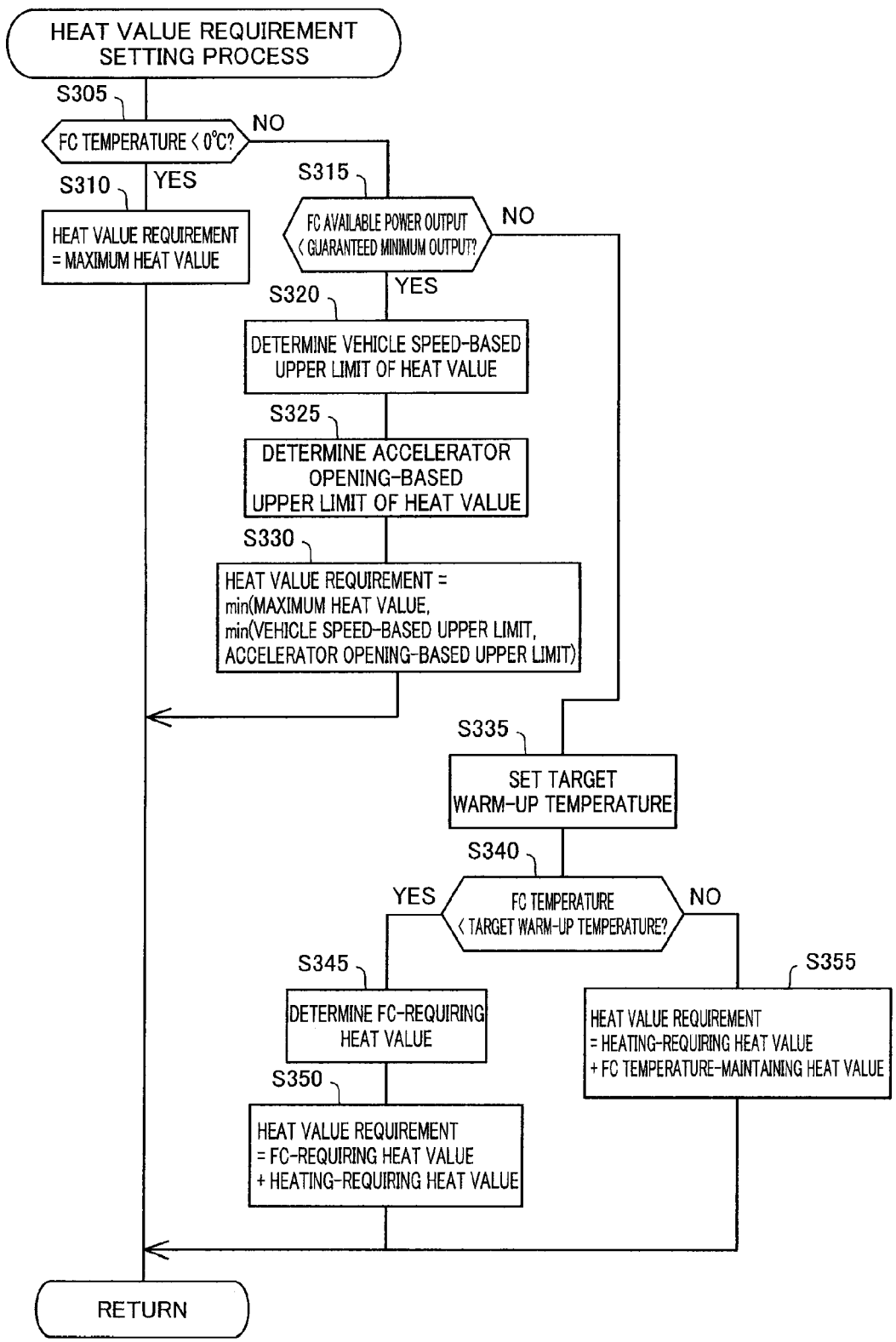
FIG. 10 is a flowchart showing one exemplary flow of heat value requirement setting process performed in a third embodiment.

FIG. 10 is a flowchart showing one exemplary flow of heat value requirement setting process performed in a third embodiment. In the third embodiment, the heat value requirement setting process of FIG. 10 is performed at step S110 of FIG. 4.

The operation controller 61a refers to the measurement of the temperature sensor 16 and determines whether the temperature of the fuel cell stack 10 is lower than 0° C. (step S305). When the temperature of the fuel cell stack 10 is lower than 0° C., the operation controller 61a sets the maximum heat value of the fuel cell stack 10 as the heat value requirement (step S310) in the same manner as the first embodiment. Setting the maximum heat value to the heat value requirement under the condition that the temperature of the fuel cell stack 10 is lower than 0° C. increases the temperature to or over 0° C. within a shortest possible time, thus making the electric vehicle drivable in a shortest possible time.

On determination at step S305 that the temperature of the fuel cell stack 10 is not lower than 0° C., the operation controller 61a subsequently determines whether the available power output of the fuel cell stack 10 has reached a preset power output (amount of electric power) (step S315). The preset power output (threshold value) used as the criterion of step S315 denotes an output value achieving a guaranteed minimum response as the output response of the fuel cell stack 10. More specifically, the preset power output may be an output value (for example, 50 kW) that is half the maximum power output (for example, 100 kW) of the fuel cell stack 10. The available power output is determinable from the current value and the voltage value at a present operating point.

On determination that the available power output of the fuel cell stack 10 is lower than the preset power output (step S315: Yes), the operation controller 61a refers to the first heat value limit map 63f to determine an upper limit of the heat value based on the vehicle speed obtained from a vehicle speed sensor (not shown) (step S320). The operation controller 61a also refers to the second heat value limit map 63g to determine an upper limit of the heat value based on the accelerator opening obtained from an accelerator opening sensor (not shown) (step S325).

FIG. 11 is an explanatory graphical representation of exemplary settings of the first heat value limit map and the second heat value limit map shown in FIG. 9. The upper map of FIG. 11 is the first heat value limit map 63f, and the lower map is the second heat value limit map 63g. The upper map of FIG. 11 is set with vehicle speed as abscissa and heat value as ordinate. The lower map of FIG. 11 is set with accelerator opening as abscissa and heat value as ordinate.

The first heat value limit map 63f correlates the vehicle speed of the electric vehicle equipped with the fuel cell system 100 with the upper limit of the heat value requirement. For example, an upper limit "a10" of the heat value requirement is set at a vehicle speed of "V1" as shown in the upper map of FIG. 11. According to the first heat value limit map 63f, the heat value requirement is limited to or below the value "a10" at the vehicle speed of "V1".

In the first heat value limit map 63f shown in the upper half of FIG. 11, the upper limit of the heat value requirement is set to increase with an increase of the vehicle speed up to a preset speed V2 and to be constant at the vehicle speed of or over the preset speed V2.

The setting of the upper limit of the heat value requirement is made for the following reason. In the condition of the high heat value requirement, the concentration overpotential is increased to enhance the reaction of Equation (1) given above. The enhanced reaction results in increasing the amount of pumping hydrogen in the fuel cell stack 10 and thereby increasing the amount of the air required for dilution of such pumping hydrogen. The increase in required amount of the air increases the rotation speed of the air compressor 32, which may cause the larger noise and vibration and make the driver feel very uncomfortable. At the high vehicle speed, however, there are relatively large driving noise and vibration, such as road noise, so that the noise and vibration caused by the increased rotation speed of the air compressor 32 are relatively insignificant to the driver. Setting the smaller value to the upper limit of the heat value requirement at the lower vehicle speed aims to reduce the occurrence of noise and vibration in the low-speed driving condition. Setting the greater value to the upper limit of the heat value requirement at the higher vehicle speed aims to improve the heat generation response. The upper limit of the heat value requirement is made constant at the vehicle speed of or over the preset speed V2, because the noise and vibration caused by the increased rotation speed of the air compressor 32 becomes more significant than the driving noise and vibration, such as the road noise, in the high speed condition of or over a certain speed level.

The second heat value limit map 63g shown in the lower half of FIG. 11 correlates the accelerator opening of the electric vehicle equipped with the fuel cell system 100 with the upper limit of the heat value requirement. For example, an upper limit "a20" of the heat value requirement is set at an accelerator opening of "D1" as shown in the lower map of FIG. 11. According to the second heat value limit map 63g, the heat value requirement is limited to or below the value "a20" at the accelerator opening of "D1".

As in the first heat value limit map 63f, in the second heat value limit map 63g shown in the lower half of FIG. 11, the upper limit of the heat value requirement is set to increase with an increase of the accelerator opening up to a preset opening degree D2 and to be constant at the accelerator opening of or above the preset opening degree D2.

The setting of the upper limit of the heat value requirement is made for the following reason. The greater accelerator opening indicates the driver's request for the higher acceleration. In this case, the larger noise and vibration accompanied with an increase of the rotation speed of the air compressor 32 hardly make the driver feel uncomfortable, since the noise and vibration increase with an increase of the acceleration. The smaller accelerator opening, on the other hand, indicates the driver's request for the lower acceleration (e.g., a request for keeping the present vehicle speed or a deceleration request). In this case, the large noise and vibration of the air compressor 32 make the driver feel very uncomfortable. Setting the smaller value to the upper limit of the heat value requirement at the smaller accelerator opening aims to reduce the occurrence of noise and vibration in the low-speed driving condition. Setting the greater value to the upper limit of the heat value requirement at the higher vehicle speed aims to improve the heat generation response. The upper limit of the heat value requirement is made constant at the accelerator opening of or above the preset opening degree D2, because the noise and vibration caused by the increased rotation speed of the air compressor 32 increase to significant levels that may make the driver feel uncomfortable, in the high acceleration condition of or over a certain acceleration level.

Referring back to FIG. 10, after setting the accelerator opening-based upper limit of the heat value requirement at step S325, the operation controller 61a compares the vehicle speed-based upper limit of the heat value requirement with the accelerator opening-based upper limit of the heat value requirement to select the smaller upper limit and further compares the selected smaller upper limit with the maximum heat value to set the smaller to the heat value requirement (step S330). When the maximum heat value is smaller than both the vehicle speed-based upper limit of the heat value requirement and the accelerator opening-based upper limit of the heat value requirement, the maximum heat value is set as the heat value requirement. When the maximum heat value is greater than at least one of the vehicle speed-based upper limit of the heat value requirement and the accelerator opening-based upper limit of the heat value requirement, on the other hand, the smaller upper limit is set as the heat value requirement.

The processing of steps S315 to S330 is performed in the case where the electric vehicle is drivable but the fuel cell stack 10 is still in the state failed to output the preset amount of electric power achieving the guaranteed minimum response. The processing of steps S315 to S330 thus aims to meet both the requirement for heating the fuel cell stack 10 and increasing the power output of the fuel cell stack 10 in a shortest possible time and the requirement for preventing the driver from feeling uncomfortable.

When the available power output of the fuel cell stack 10 has reached the preset power output (amount of electric power) with an increase in temperature of the fuel cell stack 10 (step S315: No), the operation controller 61a refers to the target warm-up temperature map 63i to set a target warm-up temperature (warm-up termination temperature) of the fuel cell stack 10, based on the temperature of the fuel cell stack 10 at the start time (hereafter referred to as "start-time temperature") and the amount of water (water amount) present in the fuel cell stack 10 at the start time (step S335).

Figure 12:
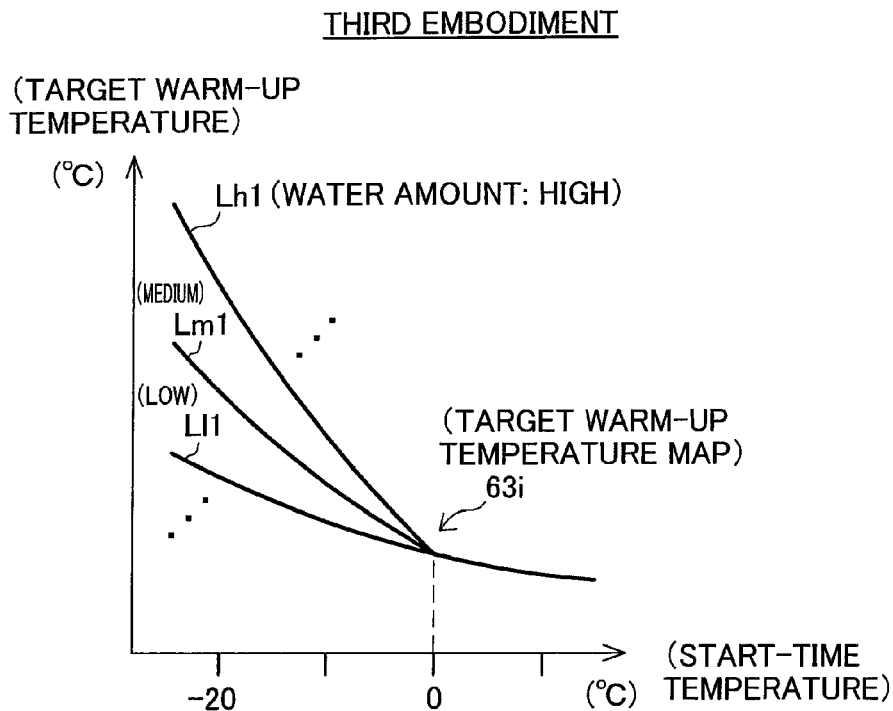
FIG. 12 is an explanatory graphical representation of exemplary settings of the target warm-up temperature map 63$i$ shown in FIG. 9.

FIG. 12 is an explanatory graphical representation of exemplary settings of the target warm-up temperature map 63i shown in FIG. 9. The map of FIG. 12 is set with start-time temperature as abscissa and target warm-up temperature as ordinate. The target warm-up temperature map 63i correlates the start-time temperature with the target warm-up temperature with respect to various levels of the water amount in the fuel cell stack 10 at the start time. In the map of FIG. 12, a curve Ll1 shows the correlation at a relatively low level of the water amount in the fuel cell stack 10 at the start time. A curve Lm1 shows the correlation at a medium level of the water amount in the fuel cell stack 10, and a curve Lh1 shows the correlation at a relatively high level of the water amount in the fuel cell stack 10.

As clearly shown by the respective curves Ll1, Lm1, and Lh1, the higher value is set to the target warm-up temperature at the lower start-time temperature in a start-up temperature range of below 0° C. The following is the reason for such setting. The lower start-time temperature gives the smaller amount of saturated vapor and thereby causes the greater amount of liquid water to be included in the fuel cell stack 10. Setting the higher value to the target warm-up temperature at the lower start-time temperature enables the fuel cell stack 10 to be warmed up to the higher temperature and facilitates removal of water in the form of water vapor from the fuel cell stack 10. The removal of water from the fuel cell stack 10 aims to enhance the gas diffusivity in each of the unit cells 20.

Under the same start-time temperature, the higher value is set to the target warm-up temperature at the higher level of the water amount in the fuel cell stack 10. The reason for such setting is the same as the above reason why the higher value is set to the target warm-up temperature at the lower start-time temperature.

One possible procedure of determining the water amount in the fuel cell stack 10 experimentally or otherwise sets the correlation of the impedance with the water amount in the fuel cell stack 10 in the form of a map. At step S335, the procedure obtains a measurement value of impedance of the fuel cell stack 10 and refers to the map to determine the water amount in the fuel cell stack 10, based on the obtained impedance. In general, the smaller water amount gives the higher impedance and the greater water amount gives the lower impedance. Another possible procedure may determine the water amount in the fuel cell stack 10 from various recorded data during a previous operation. More specifically this alternative procedure computes the amount of water produced by the electrochemical reaction from the recorded data of the current value during the previous operation and compute the discharge amount of water from the recorded data of the FC air requirement Afc, the temperature of the fuel cell stack 10, and the air pressure of the fuel cell stack 10 (the pressure of the pressure regulator 45 on the side of the fuel cell stack 10) during the previous operation. The procedure then subtracts the discharge amount of water from the amount of produced water to determine the water amount in the fuel cell stack 10.

As shown in FIG. 12, in a start-up temperature range of over 0° C., the target warm-up temperature follows one identical curve regardless of the water amount in the fuel cell stack 10.

The operation controller 61a subsequently determines whether the temperature of the fuel cell stack 10 is lower than the target warm-up temperature set at step S335 (step S340). When the temperature of the fuel cell stack 10 has not yet reached the target warm-up temperature (step S340: Yes), the operation controller 61a refers to the FC-requiring heat value map 63h to determine the heat value required to increase the temperature of the fuel cell stack 10 (hereafter referred to as "FC-requiring heat value"), based on the present temperature of the fuel cell stack 10 and the water amount in the fuel cell stack 10 at the start time (step S345).

Figure 13:
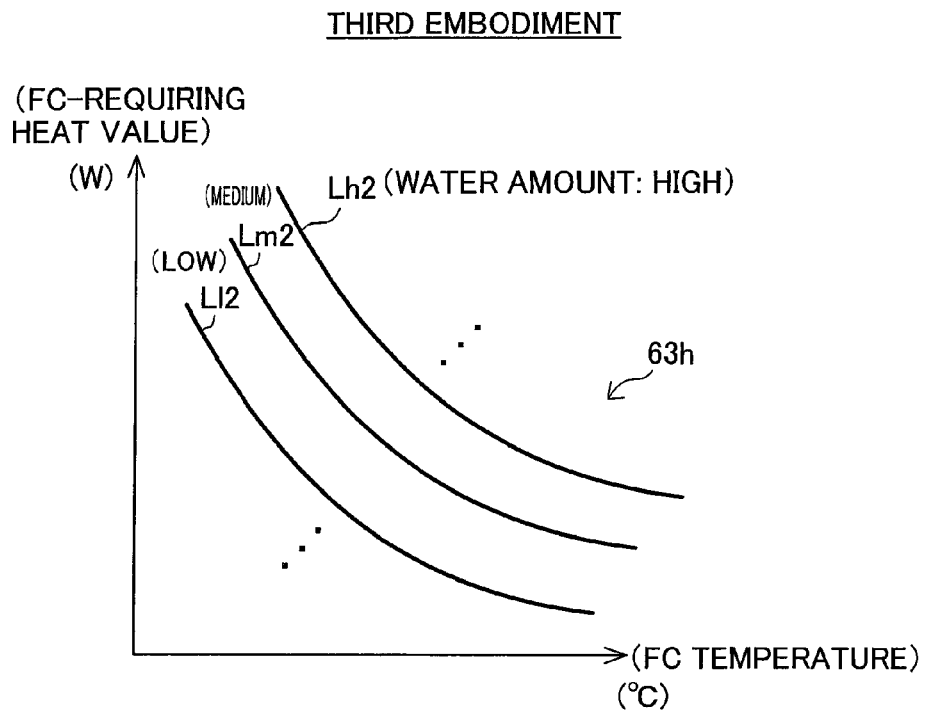
FIG. 13 is an explanatory graphical representation of exemplary settings of the FC-requiring heat value map 63$h$ shown in FIG. 9.

FIG. 13 is an explanatory graphical representation of exemplary settings of the FC-requiring heat value map 63h shown in FIG. 9. The map of FIG. 13 is set with temperature of the fuel cell stack 10 as abscissa and FC-requiring heat value as ordinate. The FC-requiring heat value map 63h correlates the temperature of the fuel cell stack 10 with the FC-requiring heat value with respect to various levels of the water amount in the fuel cell stack 10 at the start time. In the map of FIG. 13, a curve Ll2 shows the correlation at a relatively low level of the water amount in the fuel cell stack 10 at the start time. A curve Lm2 shows the correlation at a medium level of the water amount in the fuel cell stack 10, and a curve Lh2 shows the correlation at a relatively high level of the water amount in the fuel cell stack 10.

As clearly shown by the three curves Ll2, Lm2, and Lh2, under the same temperature of the fuel cell stack 10, the greater heat value is set to the FC-requiring heat value at the higher level of the water amount in the fuel cell stack 10 at the start time. Setting the greater heat value to the FC-requiring heat value facilitates removal of water in the form of water vapor from the fuel cell stack 10. As clearly shown by the respective curves Ll2, Lm2, and Lh2, the smaller heat value is set to the FC-requiring heat value at the higher temperature of the fuel cell stack 10. The temperature rise rate of the fuel cell stack 10 is lowered at the higher temperature of the fuel cell stack 10, in order to prevent the temperature of the fuel cell stack 10 from increasing over the warm-up termination temperature. Preventing the temperature rise of the fuel cell stack over the warm-up termination temperature minimizes the unnecessary low-efficiency operation and thereby improves the fuel consumption of the reactive gas.

The operation controller 61*a* sums up the FC-requiring heat value determined at step S345 and a heating-requiring heat value to set the heat value requirement (step S350). When the available power output of the fuel cell stack 10 reaches or exceeds the preset power output (amount of electric power), the fuel cell system 100 supplies the waste heat of the fuel cell stack 10 to a heating mechanism (not shown) to meet a heating demand. When there is a heating demand, the sum of the heating-requiring heat value to meet the heating demand and the heat value required to increase the temperature of the fuel cell stack 10 (FC-requiring heat value) is set as the heat value requirement (step S350). When there is no heating demand, the FC-requiring heat value is set as the heat value requirement.

On determination that the temperature of the fuel cell stack 10 is not lower than the target warm-up temperature (step S340: No), the operation controller 61*a* sets the sum of a heating-requiring heat value and a heat value required to maintain the temperature of the fuel cell stack 10 (hereafter referred to as "FC temperature-maintaining heat value") as the heat value requirement (step S355).

The FC temperature-maintaining heat value is set and stored in advance for each target warm-up temperature and is obtained by reading the stored setting from the ROM 63. A heat value determined according to the outside air temperature and the passenger compartment temperature as well as the target warm-up temperature may be set as the FC temperature-maintaining heat value. The heating-requiring heat value is identical with the heating-requiring heat value used at step S350.

The fuel cell system 100*a* of the third embodiment having the configuration discussed above has the similar effects and advantages to those of the fuel cell system 100 of the first embodiment. Additionally in the fuel cell system 100*a* of the third embodiment, until the electric vehicle is made drivable and the output of the fuel cell stack 10 reaches the preset power output achieving the guaranteed minimum response as the output response of the fuel cell stack 10, the greater heat value is set to the heat value requirement in such a degree that the noise and vibration accompanied with an increase of the rotation speed of the air compressor 32 do not make the driver feel uncomfortable. This arrangement meets both the requirement for increasing the temperature rise rate of the fuel cell stack 10 and the requirement for preventing the driver from feeling uncomfortable due to the noise and vibration.

The higher temperature is set to the target warm-up temperature (warm-up termination temperature) at the lower start-time temperature and at the higher level of the water amount in the fuel cell stack 10 at the start time. Such setting increases the amount of heat applied to the fuel cell stack 10 during the low-efficiency operation. Even when there is a large amount of water present in the fuel cell stack 10, this setting enables the large amount of water to be removed in the form of water vapor from the fuel cell stack 10.

The greater heat value is set to the FC-requiring heat value at the higher level of the water amount in the fuel cell stack 10 at the start time. Even when there is a large amount of water present in the fuel cell stack 10, such setting enables the large amount of water to be removed in the form of water vapor from the fuel cell stack 10. The smaller heat value is set to the FC-requiring heat value at the higher temperature of the fuel cell stack 10. Such setting lowers the temperature rise rate of the fuel cell stack 10 and thereby prevents the temperature of the fuel cell stack 10 from increasing over the warm-up termination temperature. This arrangement minimizes the unnecessary low-efficiency operation and improves the fuel consumption of the reactive gas. The fuel cell system 100*a* of the third embodiment accordingly achieves the requirement for minimizing the possibility to make the driver feel uncomfortable due to the noise and vibration during the low-efficiency operation, in addition to the requirement for improving the output response and the heat generation response of the fuel cell stack 10. The fuel cell system 100*a* of the third embodiment further achieves the requirement for preventing or restricting a decrease of the gas diffusivity caused by the remaining water in the fuel cell stack 10 at the start.

D. Fourth Embodiment

Figure 14:
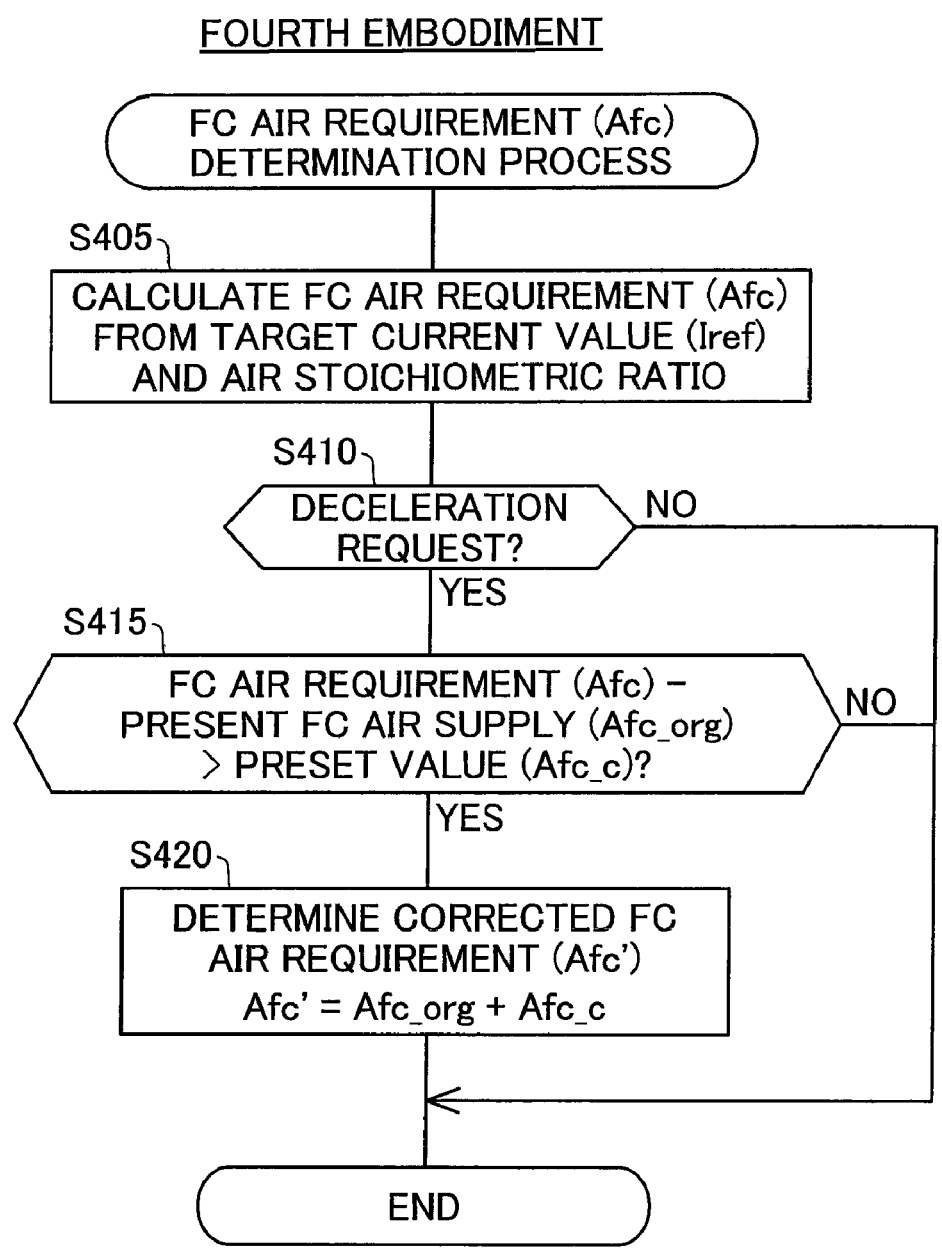
FIG. 14 is a flowchart of one exemplary flow of FC air requirement determination process performed in a fourth embodiment.

FIG. 14 is a flowchart of one exemplary flow of FC air requirement determination process performed in a fourth embodiment. The FC air requirement (Afc) determination process of FIG. 14 is performed at step S125 of FIG. 4. A fuel cell system of the fourth embodiment has the similar configuration to that of the fuel cell system 100 of the first embodiment, except execution of the FC air requirement determination process of FIG. 14 to determine the FC air requirement Afc.

The operation controller 61*a* calculates the FC air requirement Afc from the target current value Iref set at step S115 and the air stoichiometric ratio determined at step S120 of FIG. 4 according to Equation (4) given above (step S405).

The operation controller 61*a* determines whether there is a deceleration request (step S410). The deceleration request may be detected, for example, when a target output value (target current value Iref×target voltage value Vref) is smaller than a present output value (present voltage value Vorg× present current value Iorg). The deceleration request may also be detected in response to a decrease of the accelerator opening or in response to the driver's braking action.

On determination that there is a deceleration request (step S415: Yes), the operation controller 61*a* subsequently determines whether the amount of the air corresponding to the difference between the FC air requirement Afc calculated at step S405 and a present FC air supply Afc_org is greater than a preset value Afc_c (step S415). On determination that the amount of the air corresponding to the difference is greater than the preset value Afc_c, the operation controller 61*a* adds the preset value Afc_c to the present FC air supply Afc_org to determine a corrected FC air requirement Afc' (step S420). In the presence of a deceleration request, the processing of steps S415 and S420 is performed to restrict the increment of the FC air requirement Afc to or below the preset value Afc_c.

The increment of the FC air requirement Afc is restricted to the preset value Afc_c for the following reason. Even in the state of deceleration of the electric vehicle to decrease the power output requirement, the heat value requirement is not substantially lowered but is kept for the purpose of heating up the fuel cell stack 10. There is accordingly a little decrease of the current value. In this state, the concentration overpotential is increased to meet the power output requirement and the heat value requirement. This, however, results in increasing the generation amount of pumping hydrogen and thereby the amount of the air required for dilution of the pumping hydrogen. The resulting increase in rotation speed of the air compressor 32 may cause the larger noise and vibration. In spite of the driver's deceleration request of the electric vehicle, the increased noise and vibration make the driver feel very uncomfortable. The fuel cell system of the fourth embodiment accordingly restricts the increment of the FC air requirement Afc to or below the preset value Afc_c in the presence of a deceleration request. This avoids any significant increase of the noise and vibration accompanied with an increase of the rotation speed of the air compressor 32 and thereby prevents the drive from feeling uncomfortable. The preset value Afc_c is experimentally or otherwise set in advance to such an amount of the air that the driver does not feel uncomfortable.

On determination at step S410 that there is no deceleration request or on determination at step S415 that the amount of the air corresponding to the difference is not greater than the preset value Afc_c, the FC air requirement determination process is terminated. The amount of the air calculated at step S405 is then set as the FC air requirement Afc.

The fuel cell system of the fourth embodiment having the configuration discussed above has the similar effects and advantages to those of the fuel cell system 100 of the first embodiment. In the presence of a deceleration request, the fuel cell system of the fourth embodiment additionally restricts the increment of the FC air requirement to or below the preset value Afc_c. This arrangement effectively prevents the driver from feeling uncomfortable due to the increased noise and vibration of the air compressor 32, in spite of the presence of the driver's deceleration request of the electric vehicle. The fuel cell system of the fourth embodiment accordingly achieves the requirement for minimizing the possibility to make the driver feel uncomfortable due to the noise and vibration in the presence of a deceleration request of the electric vehicle, in addition to the requirement for improving the output response and the heat generation response of the fuel cell stack 10.

E. Modifications

Among the various constituents and components included in the respective embodiments discussed above, those other than the constituents and components disclosed in independent claims are additional and supplementary elements and may be omitted according to the requirements. The invention is not limited to any of the embodiments and their applications discussed above but may be actualized in diversity of other embodiments and applications within the scope of the invention. Some examples of possible modification are given below.

E1. Modification 1

In the fuel cell systems of the first through the third embodiments discussed above, when the FC air requirement Afc is smaller than the air deficiency amount Alc, the air deficiency amount Alc is set as the air supply Aac. One modified procedure may set another amount of the air different from the air deficiency amount Alc as the FC air requirement Afc. In this modification, a different map from the air deficiency amount map 63*e* shown in FIG. 3 may be used for the air deficiency amount map.

Figure 15:
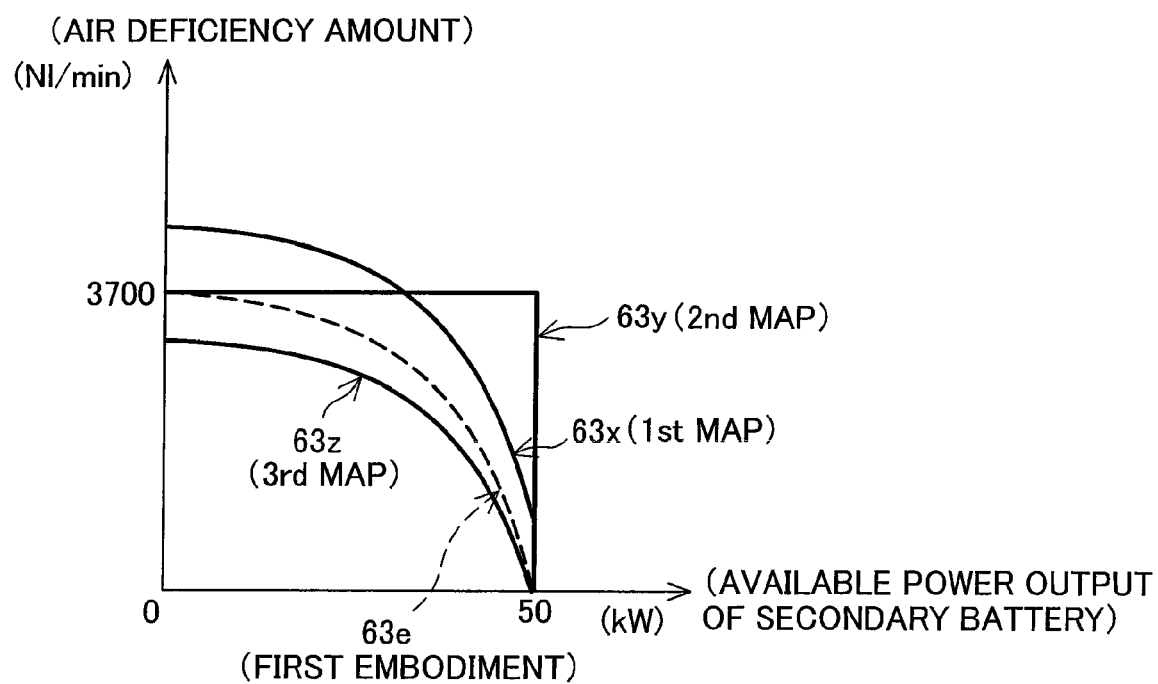
FIG. 15 is an explanatory graphical representation of exemplary settings of the air deficiency amount map adoptable in Modification 1.

FIG. 15 is an explanatory graphical representation of exemplary settings of the air deficiency amount map adoptable in Modification 1. The abscissa and the ordinate of FIG. 15 are the same as those of FIG. 3. The graph of FIG. 15 includes a first air deficiency amount map 63*x*, a second air deficiency amount map 63*y*, and a third air deficiency map 63*z* used in Modification 1. A broken-line curve shows the air deficiency amount map 63*e* of the first embodiment shown in FIG. 3.

The first air deficiency amount map 63*x* sets a greater amount of the air by a predetermined rate than the amount of the air set by the air deficiency amount map 63*e* of the first embodiment to the air deficiency amount in the range of the available power output of the secondary battery 220 of or below 50 kW. A greater amount of the air than the amount of the air set in the first embodiment is thus set to the air supply Aac of the air compressor 32 at step S150 of FIG. 4. This setting of the air deficiency amount map causes the air supply Aac to be greater than the air deficiency amount Alc, thus assuring the achievement of the preset air supply response.

The second air deficiency amount map 63*y* sets a fixed value of 3700 Nl/min to the air deficiency amount in the range of the available power output of the secondary battery 220 of or below 50 kW. The amount of the air not less than the amount of the air set in the first embodiment is thus set to the air supply Aac of the air compressor 32 at step S150. This setting of the air deficiency amount map fixes the air supply Aac regardless of the available power output of the secondary battery 220 in the range of the available power output of the secondary battery 220 of or below 50 kW, thus simplifying the processing.

The third air deficiency amount map 63*z* sets a smaller amount of the air by a predetermined rate than the amount of the air set by the air deficiency amount map 63*e* of the first embodiment to the air deficiency amount in the range of the available power output of the secondary battery 220 of or below 50 kW. Under the condition that the FC air requirement Afc is less than the air deficiency amount Alc, a greater amount of the air than the FC air requirement Afc is thus set to the air supply Aac of the air compressor 32. This setting of the air deficiency amount map does not achieve the preset air supply response but improves the air supply response compared with the arrangement of setting the FC air requirement Afc to the air supply Aac of the air compressor 32. This setting accordingly improves the output response and the heat regeneration response of the fuel cell stack 10.

In general, when the secondary battery 220 has the available power output of or below 50 kW (i.e., when the available power output is not greater than a minimum amount of electric power required for the air compressor 32 to increase the gas supply flow rate from 0 to a preset gas flow rate in a preset time period), the fuel cell system of the invention may adopt any arbitrary configuration to set a greater gas flow rate than the amount of the air (FC air requirement Afc) to be supplied to the fuel cell stack 10 for achievement of the target current value Iref as the air supply Aac of the air compressor 32.

E2. Modification 2

When the temperature of the fuel cell stack 10 is not lower than 0° C. and the available power output of the fuel cell stack 10 is less than the preset power output, the fuel cell system of the third embodiment determines the vehicle speed-based upper limit of the heat value and the accelerator opening-based upper limit of the heat value and restricts the heat value requirement to or below these upper limits. The present invention is, however, not limited this processing flow. One possible modification may skip either one of the determinations at steps S320 and S325 and restrict the heat value requirement only with the remaining upper limit of the non-skipped determination. Another possible modification may skip the processing of steps S315 to S330 but execute the processing of steps S335 to S355 when the temperature of the fuel cell stack 10 reaches or exceeds 0° C. Such modifications enable the heat value requirement to be set according to the water amount in the fuel cell stack 10 and facilitate removal of water remaining in the fuel cell stack 10.

Still another possible modification may skip the processing of steps S335 to S355 but execute the processing of steps S315 to S330 when the temperature of the fuel cell stack 10 reaches or exceeds 0° C. but is not higher than the target warm-up temperature. Such modification enables the upper limit of the heat value to be restricted according to the vehicle speed and the accelerator opening, thus preventing the driver from feeling uncomfortable due to the noise and vibration.

E3. Modification 3

The respective embodiments discussed above use the bypass valve 44 and the pressure regulator 45 to control the flow ratio of the FC air requirement Afc to the bypass air amount Abp. Only one of the bypass valve 44 and the pressure regulator 45 may be used for the same purpose. In such modification, only one valve used for controlling the flow ratio corresponds to the flow regulator in the claims of the invention. In general, the fuel cell system of the invention may adopt any arbitrary flow regulator to control the flow ratio of the flow rate of the oxidizing gas flowing through the oxidizing gas supply path to the fuel cell, to the flow rate of the oxidizing gas flowing through the oxidizing gas supply path to the bypass flow path, in the total flow of the oxidizing gas supplied from the oxidizing gas supplier.

E4. Modification 4

In the respective embodiments discussed above, the fuel cell system is mounted on the electric vehicle. The fuel cell system may be applied to any of various other moving bodies including hybrid vehicles, boats and ships, and robots. The fuel cell stack 10 may be used as a stationary power source, and the fuel cell system may be applied to a heating system in any of various constructions including buildings and houses.

E5. Modification 5

In the respective embodiments discussed above, the air is used as the oxidizing gas. Any other oxygen-containing gas, in place of the air, may be used as the oxidizing gas.

E6. Modification 6

In any of the embodiments discussed above, part or all of the software configuration may be replaced by the hardware configuration, while part or all of the hardware configuration may be replaced by the software configuration.

What is claimed is:
1. A fuel cell system, comprising:
a fuel cell;
a secondary battery connected with the fuel cell;
an oxidizing gas supplier configured to supply an oxidizing gas to the fuel cell to be utilized for power generation by the fuel cell and operated by electric power supplied from the secondary battery;
a gas supply flow regulator configured to regulate a gas supply flow rate, wherein the gas supply flow rate is amount of the oxidizing gas supplied by the oxidizing gas supplier;
an oxidizing gas supply path arranged to connect the oxidizing gas supplier with the fuel cell;
a cathode off-gas exhaust path arranged to discharge cathode off-gas from the fuel cell;
a bypass flow path arranged to connect the oxidizing gas supply path with the cathode off-gas exhaust path;
a flow regulator configured to control a flow ratio of a fuel cell-requiring gas flow rate to a bypass flow rate in a total flow of the oxidizing gas supplied from the oxidizing gas supplier, wherein the a flow ratio of a fuel cell-requiring gas flow rate is a flow rate of the oxidizing gas flowing through the oxidizing gas supply path to the fuel cell, wherein the bypass flow rate is a flow rate of the oxidizing gas flowing through the oxidizing gas supply path to the bypass flow path;
an available power output acquirer configured to obtain an available amount of power output from the secondary battery; and
an operation controller configured to set a target current value and a target voltage value of the fuel cell based on a required amount of power output and a required amount of heat for the fuel cell, and control the flow regulator to regulate the fuel cell-requiring gas flow rate and the bypass flow rate, so as to achieve low-efficiency operation of the fuel cell, where the fuel cell is operated at an operating point of a lower power generation efficiency than a power generation efficiency on a current-voltage characteristic curve of the fuel cell,
wherein the gas supply flow regulator regulates the gas supply flow rate to cause the oxidizing gas supplier to supply an excess gas flow rate, which is set to be greater than a target fuel gas-requiring gas flow rate, wherein the target fuel gas-requiring gas flow rate is the fuel cell-requiring gas flow rate to be supplied to the fuel cell in order to achieve the target current value, when the available amount of power output from the secondary battery is less than a minimum amount of electric power required for the oxidizing gas supplier to increase the gas supply flow rate from 0 to a preset gas flow rate within a preset time period, and
the operation controller controls the flow regulator to make the bypass flow rate equal to a difference gas flow rate between the excess gas flow rate and the target fuel cell-requiring gas flow rate.

2. The fuel cell system in accordance with claim 1, wherein the gas supply flow regulator regulates the gas supply flow rate such as to increase the excess gas flow rate with a decrease of the available amount of power output from the secondary battery.

3. The fuel cell system in accordance with claim 1, wherein the excess gas flow rate is the gas supply flow rate determined in advance according to the available amount of power output from the secondary battery as a required amount to increase the gas supply flow rate to the preset gas flow rate within the preset time period.

4. The fuel cell system in accordance with claim 1, wherein the operation controller corrects the target current value set according to the required amount of power output and the required amount of heat for the fuel cell, based on a current value arising from a capacitor component of the fuel cell.

5. The fuel cell system in accordance with claim 1, further comprising:
a remaining water amount acquirer configured to obtain a remaining water amount in the fuel cell at a start time of the fuel cell,
wherein the operation controller sets a termination temperature to increase with an increase of the remaining water amount, wherein the termination temperature is a temperature of terminating the low-efficiency operation.

6. The fuel cell system in accordance with claim 1, further comprising:
a temperature acquirer configured to obtain a fuel cell temperature or temperature of the fuel cell,
wherein the operation controller sets a termination temperature or temperature of terminating the low-efficiency operation to increase with a decrease of the fuel cell temperature at a start time of the fuel cell.

7. The fuel cell system in accordance with claim 1, further comprising:
a heat value requirement determiner configured to determine the required amount of heat for the fuel cell; and
a temperature acquirer configured to obtain a fuel cell temperature or temperature of the fuel cell,
wherein the operation controller continues performing the low-efficiency operation until the fuel cell temperature reaches a termination temperature or temperature of terminating the low-efficiency operation,
the required amount of heat for the fuel cell includes a temperature-rise heat value requirement, wherein the temperature-rise heat value requirement is a required amount of heat to increase the fuel cell temperature, and
when the fuel cell temperature is not lower than a preset temperature used as a criterion of detecting a vehicle drivable state but is lower than the termination temperature, the heat value requirement determiner determines the temperature-rise heat value requirement to decrease with an increase of the fuel cell temperature.

8. The fuel cell system in accordance with claim 7,
the fuel cell system being mounted on a vehicle having an accelerator,
the fuel cell system further comprising:
a speed acquirer configured to obtain a vehicle speed or speed of the vehicle; and
an accelerator opening acquirer configured to obtain an accelerator opening or opening degree of the accelerator,
wherein when the fuel cell temperature is not lower than the preset temperature but is lower than the termination temperature, the heat value requirement determiner determines the temperature-rise heat value requirement to be not higher than at least one upper limit out of a vehicle speed-based upper limit and an accelerator opening-based upper limit,
the vehicle speed-based upper limit is set to increase with an increase of the vehicle speed, and
the accelerator opening-based upper limit is set to increase with an increase of the accelerator opening.

9. The fuel cell system in accordance with claim 1,
the fuel cell system being mounted on a vehicle,
the fuel cell system further comprising:
a deceleration request acquirer configured to obtain a deceleration request for the vehicle,
wherein in response to the deceleration request, the gas supply flow regulator regulates the gas supply flow rate to achieve a variation of the regulated gas supply flow rate to be not higher than a preset level.

* * * * *